US012626999B2

(12) United States Patent
Li et al.

(10) Patent No.: US 12,626,999 B2
(45) Date of Patent: May 12, 2026

(54) SEPARATOR, BATTERY CELL, BATTERY AND ELECTRICAL APPARATUS

(71) Applicant: CONTEMPORARY AMPEREX TECHNOLOGY CO., LIMITED, Ningde (CN)

(72) Inventors: Baiqing Li, Ningde (CN); Shuangjuan Peng, Ningde (CN); Lin Peng, Ningde (CN); Cheng Ji, Ningde (CN); Yao Li, Ningde (CN); Ou Qian, Ningde (CN); Haizu Jin, Ningde (CN); Fenggang Zhao, Ningde (CN)

(73) Assignee: CONTEMPORARY AMPEREX TECHNOLOGY CO., LIMITED, Ningde (CN)

(*) Notice: Subject to any disclaimer, the term of this patent is extended or adjusted under 35 U.S.C. 154(b) by 0 days.

(21) Appl. No.: 19/303,392

(22) Filed: Aug. 19, 2025

(65) Prior Publication Data

US 2025/0385385 A1 Dec. 18, 2025

Related U.S. Application Data

(63) Continuation of application No. PCT/CN2024/072431, filed on Jan. 16, 2024.

(51) Int. Cl.
*H01M 50/411* (2021.01)
*H01M 10/0525* (2010.01)
(Continued)

(52) U.S. Cl.
CPC ..... *H01M 50/411* (2021.01); *H01M 10/0525* (2013.01); *H01M 50/491* (2021.01); *H01M 50/494* (2021.01); *H01M 2220/20* (2013.01)

(58) Field of Classification Search
CPC ............ H01M 50/411; H01M 50/491; H01M 50/494; H01M 10/0525
See application file for complete search history.

(56) References Cited

U.S. PATENT DOCUMENTS

| | | | | |
|---|---|---|---|---|
| 2019/0198935 | A1* | 6/2019 | Sasaki | H01M 4/525 |
| 2019/0348711 | A1 | 11/2019 | Watanabe | |

(Continued)

FOREIGN PATENT DOCUMENTS

| | | | |
|---|---|---|---|
| CN | 115290497 | A | 11/2022 |
| CN | 115566361 | A | 1/2023 |

(Continued)

OTHER PUBLICATIONS

International Search Report in the international application No. PCT/CN2024/072431, mailed on Mar. 26, 2024, 5 pages with English translation.

*Primary Examiner* — Jonathan G Jelsma
(74) *Attorney, Agent, or Firm* — K&L Gates LLP

(57) ABSTRACT

The present application relates to a separator, a battery cell, a battery and an electrical apparatus, wherein the separator comprises two surfaces opposite to each other along its own thickness direction, at least one of the surface of the separator and the interior of the separator comprises a pore structure, and the separator further comprises a swellable polymer; the separator satisfies: when a pressure of 1.25 MPa is applied along the thickness direction of the separator, the compression rate ΔV of the separator is ≤25%.

20 Claims, 7 Drawing Sheets

(51) Int. Cl.
*H01M 50/491* (2021.01)
*H01M 50/494* (2021.01)

(56) References Cited

U.S. PATENT DOCUMENTS

| | | | | |
|---|---|---|---|---|
| 2021/0249735 A1* | 8/2021 | Saeki | .................. | H01M 50/461 |
| 2023/0291076 A1* | 9/2023 | Lee | ....................... | H01M 4/623 |

FOREIGN PATENT DOCUMENTS

| | | | |
|---|---|---|---|
| CN | 115810873 | A | 3/2023 |
| WO | 2022110224 | A1 | 6/2022 |
| WO | 2022110225 | A1 | 6/2022 |
| WO | 2022110226 | A1 | 6/2022 |
| WO | 2022110227 | A1 | 6/2022 |

* cited by examiner

SEPARATOR, BATTERY CELL, BATTERY AND ELECTRICAL APPARATUS

CROSS-REFERENCE TO RELATED APPLICATIONS

The present application is a continuation of International Application No. PCT/CN2024/072431, filed on Jan. 16, 2024, which claims priority to the Chinese Patent Application No. 202310409606.X filed on Apr. 17, 2023 and entitled "SEPARATOR, BATTERY CELL, BATTERY AND ELECTRICAL APPARATUS," which is incorporated herein by reference in its entirety.

TECHNICAL FIELD

The present application relates to the technical field of batteries, and more particularly, to a separator, a battery cell, a battery, and an electrical apparatus.

BACKGROUND

Battery cells feature high capacity, long service life and the like, so that they are widely used in electronic devices, such as mobile phones, laptops, electromobiles, electric vehicles, electric airplanes, electric ships, electric toy cars, electric toy ships, electric toy airplanes, and electric tools.

However, as the application range of batteries becomes more and more extensive, the requirements on the performance of battery cells are becoming increasingly stringent. In order to improve the performance of battery cells, the battery cells are usually optimized and improved; however, the operational reliability and cycling performance of the battery cells are still poor.

SUMMARY OF THE INVENTION

The present application is conducted in view of the above issues, and aims to provide a separator, a battery cell, a battery, and an electrical apparatus.

In a first aspect, the present application proposes a separator, the separator comprises two surfaces opposite to each other along its own thickness direction, at least one of the surface of the separator and the interior of the separator comprises a pore structure, and the separator further comprises a swellable polymer; the separator satisfies: when a pressure of 1.25 MPa is applied along the thickness direction of the separator, the compression rate $\Delta V$ of the separator is $\leq 25\%$.

Therefore, when the separator in the embodiments of the present application meets the above conditions, the separator can have both good liquid absorption capacity and excellent compression resistance, and the pore structure will basically not undergo compression deformation, so that the electrolyte solution can be stored in the pore structure, thereby reducing the risk of the electrolyte solution being squeezed out of the electrode assembly, and improving the operational reliability and cycling performance of the battery cell.

In some embodiments, at least one surface of the separator comprises a pore structure, and the pore structure comprises a first recessed area.

In some embodiments, the separator further satisfies:

a separator with an area of 5 cm×10 cm is taken and its mass ms1 is recorded in g;

the separator is immersed in excessive electrolyte solution at 25° C. for 7 days, then taken out and placed vertically until there is no droplet for 5 min, and its mass ms2 is recorded in g, then, $((ms2-ms1)/ms1)\times 100\% \geq 10\%$.

Therefore, when the embodiments of the present application satisfy the above range, the liquid absorption capacity of the separator is relatively strong, which is conducive to adsorbing the electrolyte solution into the swellable polymer molecular chain, thereby improving the cycling performance of the battery cell.

In some embodiments, the swelling rate of the swellable polymer is ≥100%. When the swelling rate of the swellable polymer is within the above range, the electrolyte solution more easily diffuses between the polymer molecular chains of the separator, so that the separator has a better liquid absorption capacity.

In some embodiments, the compression modulus of the separator is ≥45 MPa. When the separator in the embodiments of the present application meets the above conditions, the separator has excellent compression resistance and the pore structure basically does not undergo compression deformation, thereby reducing the risk of the electrolyte solution being squeezed out of the electrode assembly, and improving the operational reliability and cycling performance of the battery cell.

In some embodiments, the separator comprises a first porous substrate film comprising the swellable polymer.

In some embodiments, the first porous substrate film is provided with the pore structure inside.

In some embodiments, the surface of the first porous substrate film comprises at least one first recessed area.

In some embodiments, the separator comprises a second porous substrate film and a coating provided on at least one side of the second porous substrate film, wherein the coating comprises the swellable polymer.

In some embodiments, the surface of the coating facing away from the second porous substrate film comprises at least one first recessed area.

In some embodiments, the first recessed area is enclosed between the coating and the second porous substrate film.

In some embodiments, the swellable polymer includes at least one of a first fluoropolymer, a first ester polymer and a first ether polymer. The aforementioned polymer has excellent swelling properties and compression modulus, which is conducive to the adsorption of the electrolyte solution, and it is not easily compressed during the charge and discharge process of the battery cell, thereby reducing the amount of the electrolyte solution flowing out of the electrode assembly.

In a second aspect, the present application further provides a battery cell comprising an electrode assembly and an electrolyte solution, wherein the electrode assembly comprises the separator according to any embodiment of the first aspect of the present application.

In some embodiments, the battery cell satisfies: $V_0/(m/\rho) \geq 1$;

in the formula, $V_0$ represents the pore volume and interlayer gap volume in the electrode assembly in mL;

m represents the difference between the mass of the battery cell before oven drying and the mass after oven drying in g;

$\rho$ represents the density of the electrolyte solution in g/mL.

Therefore, when the battery cell in the embodiments of the present application satisfies the above formula, there can be sufficient space in the electrode assembly to provide a liquid storage space for the electrolyte solution, thereby reducing the risk of the electrolyte solution flowing out of the electrode assembly, and improving the cycling performance of the battery cell.

In some embodiments, the electrode assembly comprises a first electrode plate and a second electrode plate, the first electrode plate and the second electrode plate are opposite in polarity, the separator is provided between the first electrode plate and the second electrode plate, and the surface of the first electrode plate facing toward the separator has at least one second recessed area. The second recessed area can increase the liquid storage space, reduce the risk of the electrolyte solution flowing out to the electrode assembly, and improve the cycling performance of the battery cell.

In some embodiments, the battery cell further comprises an electrolyte solution, and the electrolyte solution is located inside the electrode assembly;

optionally, the battery cell satisfies: $(m/\rho)/V_{total\ pore\ space} \geq 80\%$;

$V_{total\ pore\ space}$ represents the numerical value of pore volume of the electrode assembly in mL;

m represents the numerical value of difference between the mass of the battery cell before oven drying and the mass after oven drying in g;

ρ represents the numerical value of density of the electrolyte solution in g/mL.

Therefore, when the battery cell in the embodiments of the present application meets the above conditions, most of the electrolyte solution is located in the pore structure of the electrode assembly, that is, the electrode assembly itself has good liquid absorption and liquid retention capabilities, which is conductive to the transmission of active ions and improves the kinetic performance of the battery cell; a small part of the electrolyte solution can diffuse into the swellable polymer and be released during the battery cell's cyclic charge and discharge process. Since the amount of release is relatively small, the electrolyte solution is not easy to flow out of the electrode assembly, and the electrolyte solution can infiltrate the electrode assembly more uniformly, thereby improving the cycling performance of the battery cell.

In some embodiments, the battery cell satisfies:

$$0 \leq y/\text{Ah} \leq 15\%;$$

y represents the numerical value of volume of free electrolyte solution in the battery cell in mL;

Ah represents the numerical value of nominal capacity of the battery cell in Ah.

Therefore, when the battery cell in the embodiments of the present application meets the above conditions, the content of free electrolyte solution in the battery cell is extremely small, or even substantially no free electrolyte solution is contained in the battery cell, thereby significantly improving the operational reliability and cycling performance of the battery cell.

In some embodiments, the battery cell satisfies:

$$0 \leq y/V_{total\ pore\ space} \leq 15\%;$$

y represents the numerical value of volume of free electrolyte solution in the battery cell in mL;

$V_{total\ pore\ space}$ represents the numerical value of pore volume of the electrode assembly in mL.

Therefore, when the battery cell in the embodiments of the present application meets the above conditions, the content of free electrolyte solution in the battery cell is extremely small, or even substantially no free electrolyte solution is contained in the battery cell, thereby significantly improving the operational reliability and cycling performance of the battery cell.

In some embodiments, after the linear frequency sweep vibration test, the battery cell is charged to 100% state of charge (SOC), a hole is opened on the battery cell, the hole is provided at the lowest site in the vertical direction, and the volume of the electrolyte solution flowing out of the battery cell is recorded as M1, 0 mL≤M1≤0.5 mL, optionally, M1 is 0 mL;

wherein the vibration direction of the linear frequency sweep vibration test is: up-and-down single vibration;

the vibration frequency of the linear frequency sweep vibration test is: 10 Hz to 55 Hz;

the maximum acceleration of the linear frequency sweep vibration test is: 30 $m/s^2$;

the number of frequency sweep cycles of the linear frequency sweep vibration test is: 10 times;

the vibration time of the linear frequency sweep vibration test is: 3 h.

When the battery cell in the embodiments of the present application meets the above conditions, the content of free electrolyte solution in the battery cell is extremely small, or even substantially no free electrolyte solution is contained in the battery cell, thereby significantly improving the operational reliability and cycling performance of the battery cell.

In some embodiments, after the battery cell is subjected to the linear frequency sweep vibration test, the electrode assembly is taken out, and after the electrode assembly is subjected to the extrusion test, the volume of the electrolyte solution flowing out of the electrode assembly is recorded as M2, 0 mL≤M2≤0.5 mL, and optionally, M2 is 0 mL; wherein the extrusion direction of the extrusion test is: perpendicular to the thickness direction of the electrode assembly;

the extrusion degree of the extrusion test is: the extrusion pressure is 0.35 MPa.

When the battery cell in the embodiments of the present application meets the above conditions, the content of free electrolyte solution in the battery cell after extrusion is extremely small, or even substantially no free electrolyte solution is contained in the battery cell, thereby significantly improving the operational reliability and cycling performance of the battery cell.

In a third aspect, the present application provides a battery, the battery comprises the battery cell according to any embodiment of the second aspect of the present application.

In a fourth aspect, the present application provides an electrical apparatus, including the battery according to the third aspect of the present application.

BRIEF DESCRIPTION OF DRAWINGS

In order to explain the technical solutions of the embodiments of the present application more clearly, a brief introduction of drawings to be used in the embodiments of the present application will be made below. Apparently, the drawings described below are merely some embodiments of the present application, and other drawings can be obtained according to these drawings by those skilled in the art without creative efforts.

Figure 1:
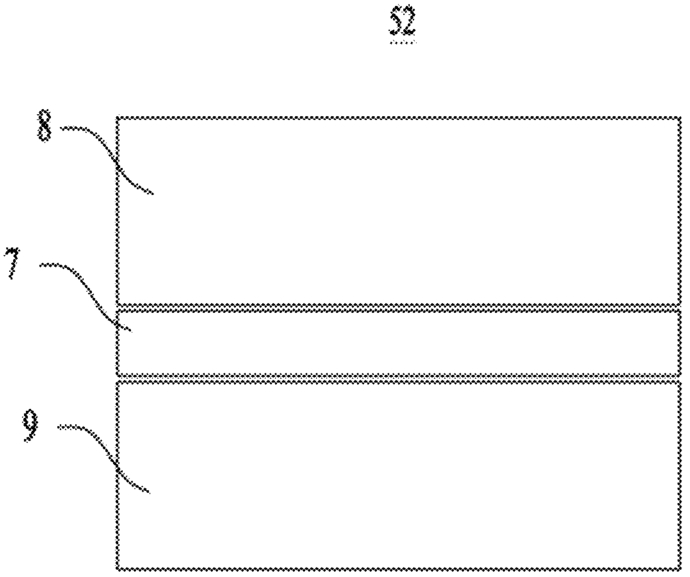
FIG. 1 is a schematic diagram of an embodiment of a separator of the present application.

The accompanying drawings may not be drawn according to the actual scale.

DESCRIPTION OF REFERENCE NUMERALS

- 1, Battery pack; 2, Upper box; 3, Lower box; 4, Battery module;
- 5, Battery cell; 51, Case; 52, Electrode assembly;
- 53, Cover plate;
- 6, Electrical apparatus;
- 7, Separator; 71, First recessed area; 711, Second porous substrate film; 712, Coating;
- 8, First electrode plate; 81, Second recessed area;
- 9, Second electrode plate.

DETAILED DESCRIPTION

Hereinafter, the embodiments of the separator, battery cell, battery and electrical apparatus of the present application are specifically disclosed by referring to the detailed description of the drawings as appropriate. However, there may be cases where unnecessary detailed descriptions are omitted. For example, there are cases where detailed descriptions of well-known items and repeated descriptions of actually identical structures are omitted. This is to avoid unnecessary redundancy in the following descriptions and to facilitate understanding by those skilled in the art. In addition, the drawings and subsequent descriptions are provided for those skilled in the art to fully understand the present application, and are not intended to limit the subject matter recited in the claims.

"Ranges" disclosed in the present application are defined in the form of lower limits and upper limits, a given range is defined by the selection of a lower limit and an upper limit, and the selected lower limit and upper limit define boundaries of a particular range. A range defined in this manner may be inclusive or exclusive of end values, and may be arbitrarily combined, that is, any lower limit may be combined with any upper limit to form a range. For example, if the ranges of 60-120 and 80-110 are listed for a particular parameter, it is understood that the ranges of 60-110 and 80-120 are also contemplated. Additionally, if the minimum range values 1 and 2 are listed, and if the maximum range values 3, 4 and 5 are listed, the following ranges are all contemplated: 1-3, 1-4, 1-5, 2-3, 2-4 and 2-5. In the present application, unless stated otherwise, the numerical range "a-b" represents an abbreviated representation of any combination of real numbers between a to b, where both a and b are real numbers. For example, the numerical range "0-5" means that all the real numbers between "0-5" have been listed herein, and "0-5" is just an abbreviated representation of combinations of these numerical values. In addition, when a parameter is expressed as an integer greater than or equal to 2, it is equivalent to disclosing that the parameter is, for example, an integer of 2, 3, 4, 5, 6, 7, 8, 9, 10, 11, 12, and the like.

Unless otherwise specified, all embodiments and optional embodiments of the present application may be combined with each other to form new technical solutions.

Unless otherwise specified, all technical features and optional technical features of the present application may be combined with each other to form new technical solutions.

Unless otherwise specified, all steps of the present application may be performed sequentially or randomly, and preferably sequentially. For example, the method comprises steps (a) and (b), meaning that the method may comprise steps (a) and (b) performed sequentially, or may comprise steps (b) and (a) performed sequentially. For example, the reference to the method may further comprise step (c), meaning that step (c) may be added to the method in any order. For example, the method may comprise steps (a), (b) and (c), or may further comprise steps (a), (c) and (b), or may further comprise steps (c), (a) and (b), and the like.

Unless otherwise specifically stated, the terms "comprising" and "including" mentioned in the present application may be open-ended, or may be closed-ended. For example, the "comprising" and "including" may indicate that it is also possible to comprise or include other components not listed, and it is also possible to comprise or include only the listed components.

Unless otherwise specifically stated, the term "or" is inclusive in the present application. For example, the phrase "A or B" means "A, B, or both A and B." More specifically, the condition "A or B" is satisfied under any one of the following conditions: A is true (or present) and B is false (or absent); A is false (or absent) and B is true (or present); or both A and B are true (or present).

The battery cell comprises an electrode assembly and an electrolyte solution. The electrode assembly comprises a positive electrode plate, a negative electrode plate, and a separator. The separator is provided between the positive electrode plate and the negative electrode plate, and its main function is to prevent the positive electrode plate and the negative electrode plate from short-circuiting, while allowing active ions to pass through freely to form a loop.

During the charge and discharge cycle of the battery cell, the volume of the electrode assembly may change (such as expansion and deformation) due to the intercalation and deintercalation of active ions from the active material, causing the electrolyte solution infiltrated in the electrode assembly to be continuously squeezed out. It is difficult to absorb the squeezed electrolyte solution back, and sufficient time is required to completely absorb it back into the electrode assembly. This leads to electrode solution shortage and bridge collapse in the electrode assembly in application scenarios such as fast charging cycles where there is not enough standing time. The active material cannot be fully infiltrated due to the bridge collapse of the electrolyte solution, and the local shortage of the electrode solution in the active material makes it impossible to cyclically charge and discharge in this area, making its kinetic performance deteriorate sharply, causing metal precipitation at the interface and increasing the risk of dendrites. As the dendrites grow, they may pierce the separator, causing short-circuit between the positive and negative electrode plates, thereby making the operational reliability and cycling performance of the battery cell deteriorate.

In view of the above problems, the present application proposes a separator, and the separator comprises a swellable polymer. The swellable polymer has a strong affinity with the electrolyte solution. After the two come into contact, the swellable polymer can lock the electrolyte solution between the polymer molecular chains by physical adsorption. When the separator is applied to a battery cell, even if the battery cell is in a high expansion state, the electrolyte solution adsorbed in the swellable polymer may be squeezed out. The electrolyte solution squeezed out can be stored in a first recessed area on the surface of the separator, that is, the first recessed area forms a liquid storage space. Due to the compression resistance of the separator, the liquid storage space will basically not be deformed, thereby reducing the risk of the electrolyte solution being squeezed out of the electrode assembly, and improving the operational reliability and cycling performance of the battery cell. Next, the technical solutions of the present application will be explained in detail.

Separator

In a first aspect, the present application provides a separator.

Figure 2:
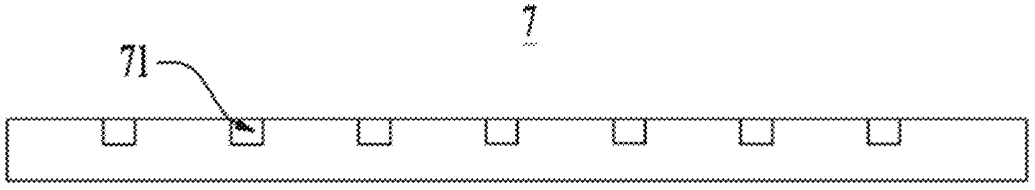
FIG. 2 is a schematic diagram of another embodiment of a separator of the present application.
Figure 3:
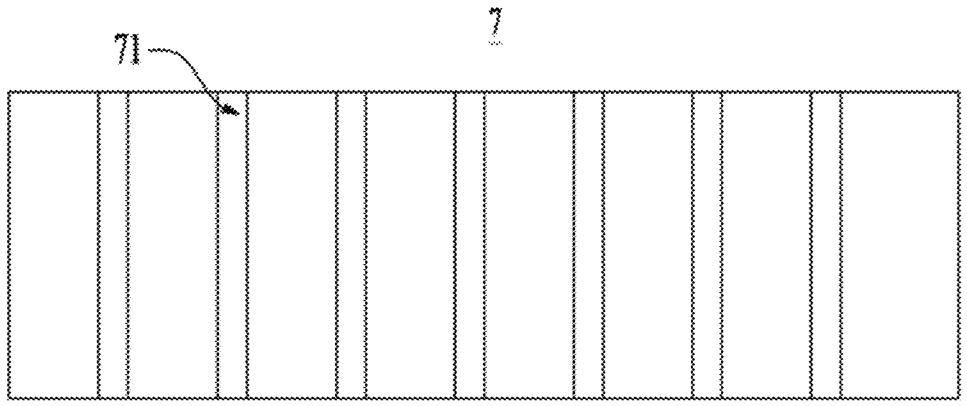
FIG. 3 is a schematic diagram of the separator shown in FIG. 2 at another angle.

As shown in FIGS. 1 to 3, a separator 7 comprises two surfaces opposite to each other along its own thickness direction, at least one of the surface of the separator 7 and the interior of the separator comprises a pore structure, and the separator 7 also comprises a swellable polymer; the separator 7 satisfies: when a pressure of 1.25 MPa is applied along the thickness direction of the separator 7, the compression rate $\Delta V$ of the separator 7 is $\leq 25\%$.

In some embodiments, the interior of the separator 7 comprises a pore structure. As some examples, the pore structure can be understood as follows: the separator 7 is a porous structure, the swellable polymer is located inside the separator 7, the electrolyte solution is adsorbed and stored inside the separator 7, and the swellable polymer can be released to the pore structure of the separator 7. As some other examples, the swellable polymer may be prepared as a separator having a pore structure therein, which is conducive to adsorbing the electrolyte solution and storing the electrolyte solution inside the separator 7. In the above structure, the pore structure may be a three-dimensional cross-linked pore structure; or, the pore structure may be blind holes, through holes or the like provided inside the separator. The separator can be prepared into a separator with pores (such as separator with bubble pores) by the phase inversion method or the extraction method, and pores can be formed in the separator by fiber spinning (such as biaxial stretching).

In some embodiments, at least one surface of the separator 7 comprises a pore structure. The pore structure may be understood as a blind hole structure, that is, the pore structure does not run through the separator 7. Optionally, the pore structure comprises a first recessed area 71 (blind hole structure).

The separator 7 comprises a swellable polymer, which has good lyophilicity and strong affinity with the electrolyte solution. The swellable polymer can lock the electrolyte solution between polymer molecular chains by physical adsorption. When the volume of the battery cell expands, the electrolyte solution may be partially squeezed out and flow into the pore structure. The pore structure, as the liquid storage space, can effectively reduce the amount of the electrolyte solution flowing out of the electrode assembly and provide good and uniform infiltration of the electrode assembly, thereby improving the operational reliability and cycling performance of the battery cell.

The pore structure inside the separator 7 can adsorb the electrolyte solution into the separator 7, and even if the electrolyte solution is separated from the swellable polymer, it will flow to the pore structure inside the separator 7 and will basically not flow out of the separator 7.

The first recessed area 71 refers to the space formed by a portion of the surface of the separator 7 being recessed toward the interior of the separator 7. The first recessed area 71 serves as a liquid storage space for the electrolyte solution. When the volume of the battery cell expands, components in the electrode assembly, such as the separator 7, are subjected to a certain extrusion force, and the electrolyte solution locked in the polymer may be squeezed out. The electrolyte solution is fluid, and since the separator 7 has good lyophilicity, it will guide the electrolyte solution to flow into the liquid storage space, thereby reducing the risk of the electrolyte solution flowing out of the electrode assembly, achieving good and uniform infiltration of the electrode assembly.

When the separator 7 in the embodiments of the present application meets the above conditions, the separator 7 has excellent compression resistance, and the pore structure basically does not undergo compression deformation, so that the electrolyte solution is not easy to separate from the swellable polymer. Even if the electrolyte solution flows out of the swellable polymer, it can be stored in the pore structure, thereby reducing the risk of the electrolyte solution being squeezed out of the electrode assembly, and improving the operational reliability and cycling performance of the battery cell.

The compression rate of the separator 7 has a meaning well known in the art and can be tested using devices and methods well known in the art, for example, according to the national standard GB/T 1041-2008 Plastics-Determination of Compressive Properties. Specifically, the separator 7 may come from the separator 7 itself, or from a battery cell. When the separator 7 comes from itself, it is not necessary to dry it and the compression performance test can be carried out directly; when the separator 7 comes from the battery cell, the separator 7 needs to be dried and the compression performance test can be carried out after the drying treatment. The drying process is as follows: the battery cell is disassembled, the separator 7 is taken out, and the separator 7 is placed in an oven at 60° C. to dry for 2 h. The test process of the compression performance is as follows: the separator 7 is spread flat on a flat aluminum foil surface, and covered with a layer of aluminum foil to ensure that the separator 7 is flat. A separator 7 with a fixed area is cut as a sample (such as 5 cm×5 cm), 50 groups of samples are taken, and the upper and lower surfaces of each group of samples of separator 7 are covered with an aluminum foil. The 50 groups of samples are stacked together for subsequent compression testing; 100 aluminum foils of the same size were cut and the 100 aluminum foils are stacked together as the blank group. A universal tensile machine is used to perform the test in compression mode at a speed of 0.5 mm/min, and the stress-strain curve is recorded to obtain the compression rate of the sample of separator 7.

In some embodiments, the compression rate ΔV of the separator 7 can be 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, 1%, 0.5%, 02%, 0.1%, or a range consisting of any two of the above numerical values.

In some embodiments, the separator 7 further satisfies:

a separator 7 with an area of 5 cm×10 cm is taken and its mass ms1 is recorded;

the separator 7 is immersed in excessive electrolyte solution (the mass ratio of the separator to the electrolyte solution is ≥1:100) at 25° C. for 7 days, then the separator 7 is taken out, and the separator 7 is placed vertically until there is no droplet for 5 min, and its mass ms2 is recorded, then, ((ms2−ms1)/ms1)×100%≥10%.

The unit of ms1 is g, and the unit of ms2 is g.

The ((ms2−ms1)/ms1)×100% in the embodiments of the present application can be understood as the liquid absorbency of the separator 7, which can characterize the ability of the separator 7 to absorb the electrolyte solution. As the liquid absorbency increases, the ability of the separator 7 to absorb the electrolyte solution becomes stronger; as the liquid absorbency decreases, the ability of the separator 7 to absorb the electrolyte solution becomes weaker. When the embodiments of the present application satisfy the above range, the liquid absorption capacity of the separator 7 is relatively strong, which is conducive to adsorbing the electrolyte solution into the swellable polymer molecular chain, thereby improving the cycling performance of the battery cell. The electrolyte solution in which the separator 7 is immersed is a standard electrolyte solution, or the composition of the electrolyte solution of Example 1 is adopted.

Exemplarily, the liquid absorbency of the separator 7 can be 10%, 12%, 15%, 16%, 18%, 20%, 22%, 23%, 24%, 25%, 26%, 28%, 30%, 32%, 34%, 35%, 36%, 38%, 40%, 42%, 45%, 48%, 50%, 52%, 55%, 56%, 58%, 60%, 65%, 70%, 75%, 80%, 85%, 90%, 92%, 95%, 96%, 97%, 98%, or a range consisting of any two of the above numerical values.

In some embodiments, the swelling rate of the swellable polymer is ≥100%.

When the swelling rate of the swellable polymer is within the above range, the electrolyte solution more easily diffuses between the polymer molecular chains of the separator 7, so that the separator 7 has a better liquid absorption capacity. Exemplarily, the swelling rate of the swellable polymer 7 can be 100%, 105%, 108%, 110%, 112%, 115%, 118%, 120%, 125%, 130%, 135%, 140%, 145%, 150%, 155%, 160%, 165%, 170%, 175%, 180%, 185%, 190%, 195%, 200%, 210%, 220%, 250%, 280%, 300%, 320%, 350%, 380%, 400%, 420%, 450%, 480%, 490%, 500%, 520%, 550%, 580%, 600%, 620%, 650%, 680%, 700%, 720%, 750%, 800%, 820%, 850%, 900%, 920%, 950%, 980%, 1000%, or a range consisting of any two of the above numerical values.

Swelling rate has a meaning well known in the art, and can be detected by common devices and methods in the art. For example, when the separator is mainly made of a swellable polymer (the swellable polymer is the main material of the substrate), the separator can be used as a test sample.

When the separator comprises a coating containing a swellable polymer, the separator can be first immersed in N-methyl pyrrolidone NMP (the mass ratio of the separator to NMP is 1:20), and stirred at 2000 rpm for 2 h to fully dissolve or peel off the swellable polymer on the surface of the separator to obtain a solution of the swellable polymer in NMP. The solution is prepared into an adhesive film, and the adhesive film is used as a test sample. For example, after stirring at 1200 rpm for 2 h and drying at 130° C. for ≥8 h, a polymer film can be obtained, and a polymer film with a width of 10 mm, a length of 10 mm, and a thickness of 1 mm is taken as the adhesive film.

A test sample with a width of 10 mm and a length of 10 mm is taken as the specimen and its mass is recorded as the initial mass;

The specimen is added into excessive dimethyl carbonate DMC (the mass ratio of the specimen to DMC is 1:100), and after standing at 25° C. for 7 days, a swollen specimen is obtained, and its mass is recorded as the swollen mass;

The swelling rate of a swellable polymer is (swollen mass-initial mass) multiplied by 100 percent.

In some embodiments, a pressure of 1.25 MPa is applied along the thickness direction of the separator 7, and the compression modulus of the separator 7 is ≥45 MPa.

When the separator 7 in the embodiments of the present application meets the above conditions, the separator 7 has excellent compression resistance and the pore structure such as the first recessed area 71 basically does not undergo compression deformation, thereby reducing the risk of the electrolyte solution being squeezed out of the electrode assembly, and improving the operational reliability and cycling performance of the battery cell. Exemplarily, the compression modulus of the separator 7 can be 45 MPa, 46 MPa, 48 MPa, 50 MPa, 52 MPa, 55 MPa, 58 MPa, 60 MPa, 62 MPa, 65 MPa, 68 MPa, 70 MPa, 72 MPa, 75 MPa, 80 MPa, 85 MPa, 90 MPa, 95 MPa, 100 MPa, 110 MPa, 120 MPa, 130 MPa, 150 MPa, or a range consisting of any two of the above numerical values.

The compression modulus of the separator 7 has a meaning well known in the art and can be tested using devices and methods well known in the art, for example, according to the national standard GB/T 1041-2008 Plastics-Determination of Compressive Properties. For example, the separator 7 can be cut into ones with a fixed area (such as 5 cm×5 cm), 500 layers as a group (with a thickness of about 5 mm) for compression testing.

The separator 7 in the embodiments of the present application comprises two surfaces, one of which is provided close to the positive electrode plate of the battery cell, and the other is provided close to the negative electrode plate of the battery cell. One of the two surfaces may comprise the first recessed area 71, or both surfaces may comprise the first recessed area 71. Exemplarily, the surface of the two surfaces close to the negative electrode plate comprises the first recessed area 71. The surface of the two surfaces close to the positive electrode plate comprises the first recessed area 71. Optionally, both surfaces of the separator 7 comprise at least one first recessed area 71.

In some embodiments, the projection contour of the first recessed area 71 along the thickness direction of the separator 7 may be a polygon, a circle, an ellipse, a sector, a semi-ellipse, an irregular shape, or the like.

Exemplarily, the polygon can be a regular polygon or an irregular polygon; for example, the polygon can be a triangle, a trapezoid, a tetragon, a pentagon or a hexagon. Specifically, the polygon is a tetragon, and the first recessed area 71 can be a long strip extending along the length direction or the width direction of the separator 7, etc.

Exemplarily, the sector may be a portion of a circle, such as a semicircle, ⅓ circle, and so on.

The number of the first recessed area 71 may be one or more.

When there are a plurality of first recessed areas 71, the projection contour shapes of the first recessed areas 71 may be the same or different. For example, the projection contour shape of one of the first recessed areas 71 may be circular, while the projection contour shape of another first recessed area 71 may be a strip, etc.

When the projection contour shape of the first recessed area 71 is a long strip, the extension direction of the first recessed area 71 is parallel or approximately parallel to the width direction of the separator 7, or the extension direction of the first recessed area 71 is parallel or approximately parallel to the length direction of the separator 7.

In some embodiments, the angle between the extension direction of the first recessed area 71 and the length direction of the separator 7 is −45° to 45° Exemplarily, the angle between the extension direction of the first recessed area 71 and the length direction of the separator 7 can be −45°, −30°, −25°, −20°, −15°, −10°, −5°, −2°, −1°, 0°, 1°, 2°, 5°, 10°, 15°, 20°, 25°, 30°, 45°, or a range consisting of any two of the above numerical values. Optionally, it is −20° to 20°, −15° to 15°, −10° to 10° or −5° to 5°. In the embodiments of the present application, when the angle between the extension direction of the first recessed area 71 and the length direction of the separator 7 is 0°, it means that the extension direction of the first recessed area 71 is parallel to the length direction of the separator 7.

In some embodiments, the angle between the extension direction of the first recessed area 71 and the width direction of the separator 7 is −45° to 45°. Exemplarily, the angle between the extension direction of the first recessed area 71 and the width direction of the separator 7 can be −45°, −30°, −25°, −20°, −15°, −10°, −5°, −2°, −1°, 0°, 1°, 2°, 5°, 10°, 15°, 20°, 25°, 30°, 45°, or a range consisting of any two of the above numerical values. Optionally, it is −20° to 20°, −15° to 15°, −10° to 10° or −5° to 5°. In the embodiments of the present application, when the angle between the extension direction of the first recessed area 71 and the width direction of the separator 7 is 0°, it means that the extension direction of the first recessed area 71 is parallel to the width direction of the separator 7.

In the case where there is only one first recessed area 71, the extension direction of the first recessed area 71 may be unique, for example, it extends along the length direction of the separator 7.

In the case where there are a plurality of first recessed areas 71, the extension direction of the first recessed areas 71 may be unique, for example, they extend along the length direction of the separator 7, and the plurality of first recessed areas 71 are provided in parallel. The extension direction of the first recessed area 71 may also include a plurality of directions. For example, the extension direction of one of the first recessed areas 71 is parallel to the length direction of the separator 7, and the extension direction of another first recessed area 71 is at an angle of 5° to the length direction of the separator 7. In this way, the extension directions of the two first recessed areas 71 may be intersecting.

In the case where a plurality of first recessed areas 71 are provided, the first recessed areas 71 may be provided at intervals or continuously. When the first recessed areas 71 are provided at intervals, they may be arranged in an array or in a non-uniform manner. A plurality of first recessed areas 71 are provided at intervals, which can increase the overall volume occupied by the plurality of first recessed areas 71, enhance the mechanical strength of the separator 7, and improve the structural stability of the separator 7. When the volume of the battery cell expands, the separator 7 is not easily deformed, thereby making the first recessed area 71 (liquid storage space) relatively stable and not easily deformed. The first recessed areas 71 being provided continuously can be understood as that the projections of two adjacent first recessed areas 71 along the thickness direction of the separator 7 are continuously provided. This structure is beneficial to increasing the overall volume occupied by the plurality of first recessed areas 71 and the volume occupied by the liquid storage space.

In some embodiments, the separator 7 comprises a first porous substrate film, and the first porous substrate film comprises a swellable polymer.

The swellable polymer can be used as the main material of the first porous substrate, and can be prepared into a first porous substrate film with pores (such as bubble pores) by the phase inversion method or the extraction method, or pores can be made by fiber spinning (such as biaxial stretching).

The main material of the first porous substrate may also include at least one of glass fiber, non-woven fabric, polyethylene, polypropylene and polyvinylidene fluoride. The main material of the first porous substrate and the swellable polymer are blended to prepare the first porous substrate film.

The above first porous substrate film may have a pore structure inside.

FIG. 1 shows such a structure of a separator, and the separator with this structure may not comprise a coating.

Optionally, the first porous substrate film comprises two surfaces opposite to each other along the thickness direction of the separator 7, and at least one of the two surfaces comprises at least one first recessed area 71. FIGS. 2 and 3 show such a structure of a separator.

Further optionally, both surfaces of the first porous substrate film comprise at least one first recessed area 71.

For this type of separator 7, it can be understood that the first porous substrate film is no longer provided with an additional coating 712 on its surface. Since the first porous substrate film incorporates a swellable polymer, the first porous substrate film has the ability to absorb liquid, attracting and locking the electrolyte solution into the first porous substrate film, thereby reducing the amount of free electrolyte solution and improving the operational reliability of the battery cell.

The first porous substrate in the embodiments of the present application can be a single-layer film or a multi-layer composite film. When the first porous substrate is a multi-layer composite film, the materials of the layers may be the same or different.

Figure 4:
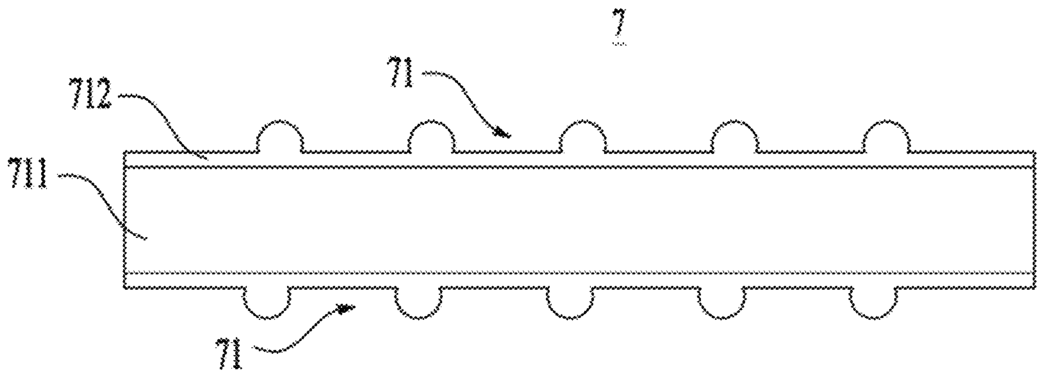
FIG. 4 is a schematic diagram of another embodiment of a separator of the present application.
Figure 5:
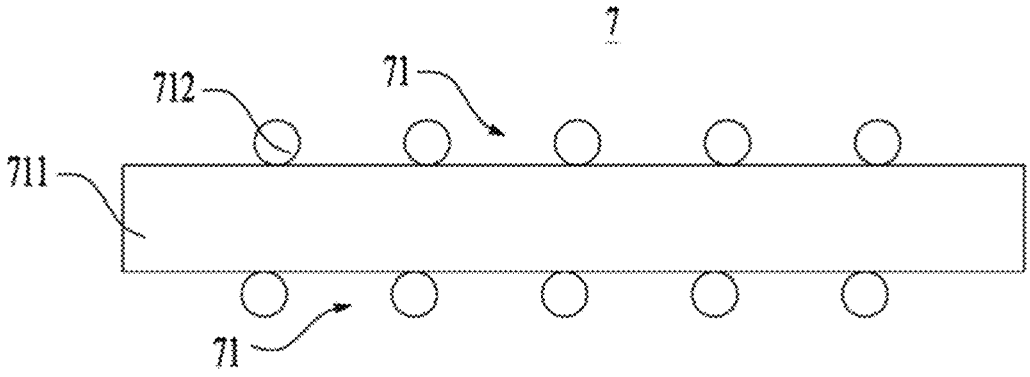
FIG. 5 is a schematic diagram of another embodiment of a separator of the present application.
Figure 6:
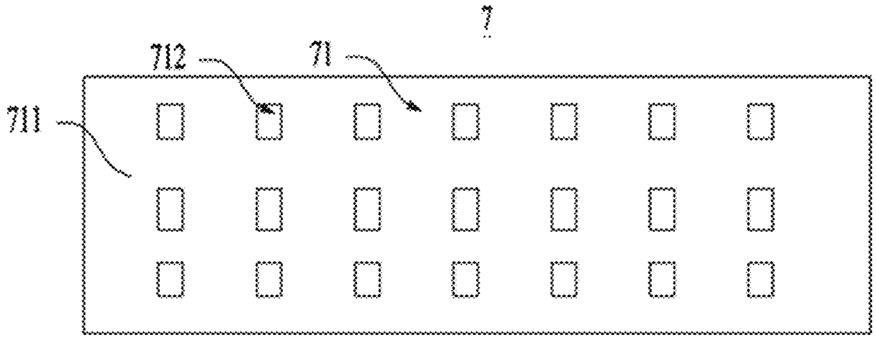
FIG. 6 is a schematic diagram of another embodiment of a separator of the present application.

As shown in FIGS. 4 to 6, in some other embodiments, the separator 7 comprises a second porous substrate film 711 and a coating 712 provided on at least one side of the second porous substrate film 711, and the coating 712 comprises a swellable polymer.

The coating 712 may be continuously provided as a whole film layer. In this case, the surface of the coating 712 facing away from the second porous substrate film 711 comprises at least one first recessed area 71. FIG. 4 is a schematic diagram showing that the coating 712 is a whole film layer.

The coating 712 can be provided continuously. In this case, the coating 712 may not be a whole film layer, some local areas are too thin or even have no coating 712, so that part of the surface of the second porous substrate film 711 is exposed, and the cavity corresponding to the exposed surface is the first recessed area 71, that is, the first recessed area 71 is enclosed between the coating 712 and the second porous substrate film 711.

The coating 712 can also be provided non-continuously. In this case, the coating 712 is not a whole film layer, part of the surface of the second porous substrate film 711 is exposed, and the cavity corresponding to the exposed surface is the first recessed area 71, that is, the first recessed area 71 is enclosed between the coating 712 and the second porous substrate film 711. For example, the coating 712 includes a plurality of protrusions, and the first recessed area 71 is enclosed between the second porous substrate film 711 and the plurality of protrusions. FIG. 5 shows that the coating 712 is of a structure of strips provided at intervals. FIG. 6 shows that the coating 712 may be distributed in a dotted manner, and the dotted distribution may be array distribution or non-uniform distribution.

The coating 712 can be provided on one side of the second porous substrate 711, or on both sides of the second porous substrate 711; the coating 712 can be directly provided on the surface of the second porous substrate 711, or indirectly provided on the surface of the second porous substrate 711. When the coating 712 is indirectly provided on the surface of the second porous substrate 711, other functional layers such as a heat-resistant coating 712 can also be provided between the coating 712 and the second porous substrate 711. The surface of the second porous substrate film 711 in the separator 7 is provided with a coating 712. Since the coating 712 contains a swellable polymer, the coating 712 has the ability to absorb liquid, and the electrolyte solution is attracted and locked in the coating 712, thereby reducing the amount of free electrolyte solution and improving the operational reliability of the battery cell.

In the embodiments of the present invention, the material of the second porous substrate film 711 is not particularly limited in the present disclosure and any well-known substrate having good chemical stability and mechanical stability may be selected, such as at least one of glass fiber, non-woven fabric, polyethylene, polypropylene and polyvinylidene fluoride. The first porous substrate can be a single-layer film or a multi-layer composite film. When the first porous substrate is a multi-layer composite film, the materials of the layers may be the same or different.

In some embodiments, the second porous substrate film 711 may further comprise a swellable polymer. In this case, the material and structure of the second porous substrate film 711 are as described in the first porous substrate film and will not be repeated here.

In some embodiments, the swellable polymer includes at least one of a first fluoropolymer, a first ester polymer, and a first ether polymer.

The aforementioned polymer has excellent swelling properties and compression modulus, which is conducive to the adsorption of the electrolyte solution, and it is not easily compressed during the charge and discharge process of the battery cell, thereby reducing the amount of the electrolyte solution flowing out of the electrode assembly.

[First Fluoropolymer]

In some embodiments, the first fluoropolymer comprises at least one of the structural units represented by formula (AI) to the structural units represented by formula (AIII), Formula (AI)

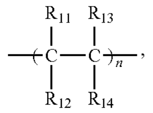

Formula (AII)

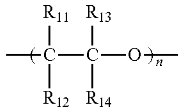

in formula (AI) and formula (AII), $R_{11}$, $R_{12}$, $R_{13}$ and $R_{14}$ each independently include a hydrogen atom, a fluorine atom, a chlorine atom, substituted or unsubstituted alkyl or substituted or unsubstituted alkoxy, and at least one of $R_{11}$, $R_{12}$, $R_{13}$ and $R_{14}$ includes a fluorine atom.

Optionally, $R_{11}$, $R_{12}$, $R_{13}$ and $R_{14}$ each independently include a hydrogen atom, a fluorine atom, a chlorine atom, substituted or unsubstituted C1-C10 alkyl or substituted or unsubstituted C1-C10 alkoxy.

Optionally, when substituted, the substituent may include one or more of cyano (—CN), nitro, sulfo, sulfonyl, amido, carboxyl, an ester group, a halogen atom.

Formula (AIII)

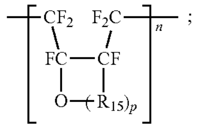

In formula (AIII), $R_{15}$ includes a single bond, substituted or unsubstituted alkyl; when substituted, the substituent includes a fluorine atom.

In some embodiments, p is a positive integer selected from 1 to 3.

In some embodiments, $R_{11}$, $R_{12}$, $R_{13}$ and $R_{14}$ each independently include a hydrogen atom, a fluorine atom, a chlorine atom, substituted or unsubstituted alkyl or substituted or unsubstituted alkoxy.

Optionally, $R_{11}$, $R_{12}$, $R_{13}$ and $R_{14}$ each independently include a hydrogen atom, a fluorine atom, a chlorine atom, substituted or unsubstituted C1-C10 alkyl or substituted or unsubstituted C1-C10 alkoxy.

Further optionally, $R_{11}$, $R_{12}$, $R_{13}$ and $R_{14}$ each independently include a hydrogen atom, a fluorine atom, a chlorine atom, methyl, fluoromethyl, methoxy or perfluoromethoxy.

In some embodiments, when substituted, the substituent may include one or more of cyano (—CN), nitro, sulfo, sulfonyl, amido, carboxyl, an ester group, a halogen atom.

In some embodiments, the first fluoropolymer comprises at least one of the structural units represented by formula (AI-1) to the structural units represented by formula (AI-11), Formula (AI-1)

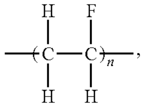

-continued

Formula (AI-2)

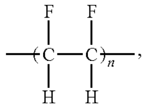

Formula (AI-3)

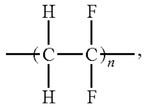

Formula (AI-4)

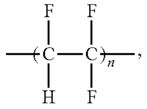

Formula (AI-5)

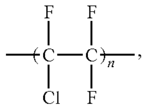

Formula (AI-6)

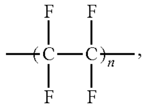

Formula (AI-7)

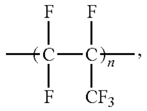

Formula (AI-8)

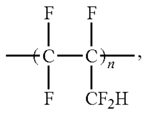

Formula (AI-9)

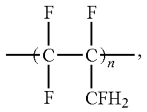

Formula (AI-10)

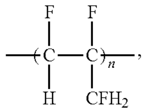

Formula (AI-11)

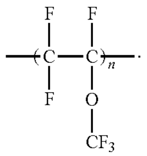

In some embodiments, the first fluoropolymer comprises at least one of the structural units represented by formula (AII-1) to the structural units represented by formula (AII-5), Formula (AII-1)

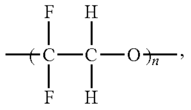

-continued

Formula (AII-2)

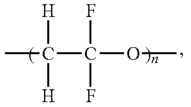

Formula (AII-3)

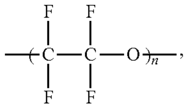

Formula (AII-4)

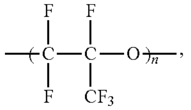

Formula (AII-5)

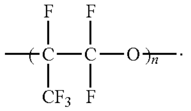

In some embodiments, the first fluoropolymer comprises at least one of the structural units represented by formula (AIII-1) to the structural units represented by formula (AIII-3), Formula (AIII-1)

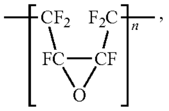

Formula (AIII-2)

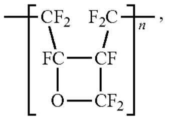

Formula (AIII-3)

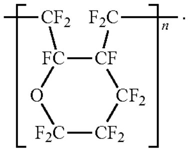

Exemplarily, the fluoropolymer includes one or more of polyperfluoroethylene PTFE, polyvinylidene fluoride PVDF, perfluoroethylene propylene copolymer FEP, perfluoroalkoxy polymer PFA, perfluoropolyether PFPE, polyvinylidene fluoride-hexafluoropropylene copolymer PVDF-HFP, polyvinylidene fluoride-trifluoroethylene copolymer PVDF-TrFE and perfluoro (1-butenyl vinylether) polymer (CYTOP for short).

Optionally, the fluoropolymer includes one or more of polyperfluoroethylene PTFE, polyvinylidene fluoride PVDF, perfluoroethylene propylene copolymer FEP, polyvinylidene fluoride-hexafluoropropylene copolymer PVDF-HFP, and polyvinylidene fluoride-trifluoroethylene copolymer PVDF-TrFE.

The fluoropolymer may be derived from one or more of the following monomers: fluorinated cyclic hydrocarbon monomer, vinyl fluoride, 1,2-difluoroethylene, vinylidene fluoride, trifluoroethylene, chlorotrifluoroethylene, tetrafluoroethylene, hexafluoropropylene, 3,3,3-trifluoropropylene, trifluoropropylene, tetrafluoropropylene, pentafluoropropylene, and the like. Optionally, the fluoropolymer may be derived from at least two of the following monomers: fluorinated cyclic hydrocarbon monomer, vinyl fluoride, 1,2-difluoroethylene, vinylidene fluoride, trifluoroethylene, chlorotrifluoroethylene, tetrafluoroethylene, hexafluoropropylene, 3,3,3-trifluoropropylene, trifluoropropylene, tetrafluoropropylene, pentafluoropropylene.

In the embodiments of the present application, the polymer can also be obtained by copolymerizing the above-mentioned structural groups with a small amount of other types of structural groups (such as olefin structural units, ester monomers, nitrile monomers such as acrylonitrile, amide monomers such as acrylamide, acrylic acid structural units). The lyophilic property of such small amount of monomers is relatively poor. The above-mentioned fluoropolymer monomers are copolymerized with such monomers to improve the swelling rate and compression modulus of the swellable polymer.

In some embodiments, the molecular weight of the swollen polymer is $2\times10^5$ g/mol to $1.2\times10^6$ g/mol.

The present application can adjust at least one of the swelling rate and the compression modulus of the swellable polymer by adjusting the molecular weight.

Exemplarily, the molecular weight of the polymer can be $2\times10^5$ g/mol, $5\times10^5$ g/mol, $8\times10^5$ g/mol, $1\times10^6$ g/mol, $1.2\times10^6$ g/mol, or a range consisting of any two of the above numerical values.

[First Ether Polymer]

In some embodiments, the first ether polymer comprises a structural unit represented by formula (BI), Formula (BI)

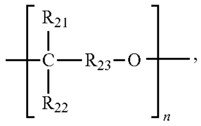

in formula (BI), $R_{21}$ and $R_{22}$ each independently include a hydrogen atom, substituted or unsubstituted alkyl, or substituted or unsubstituted alkoxy; and $R_{23}$ includes a single bond, substituted or unsubstituted methylene.

Optionally, $R_{21}$ and $R_{22}$ each independently include a hydrogen atom, substituted or unsubstituted C1-C10 alkyl or substituted or unsubstituted C1-C10 alkoxy.

Optionally, $R_{23}$ includes a single bond, substituted or unsubstituted C1-C10 methylene.

In some embodiments, when substituted, the substituent may include one or more of cyano (—CN), nitro, sulfo, sulfonyl, amido, carboxyl, an ester group, a halogen atom.

Exemplarily, the first ether polymer comprises at least one of the structural units represented by formula (BI-1) to the structural units represented by formula (BI-8), Formula (BI-1)

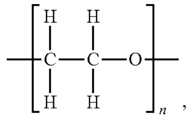

Formula (BI-2)

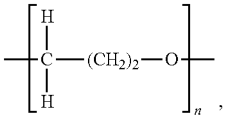

-continued

Formula (BI-3)

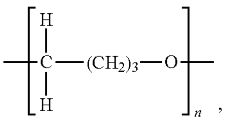

Formula (BI-4)

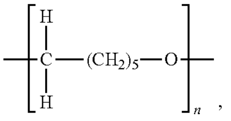

Formula (BI-5)

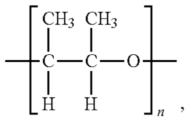

Formula (BI-6)

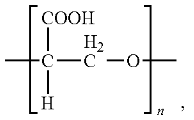

Formula (BI-7)

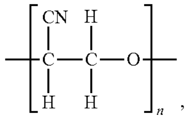

Formula (BI-8)

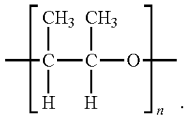

In some embodiments, the first ether polymer comprises a structural unit represented by formula (BII), Formula (BII)

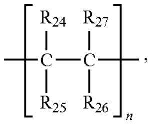

in formula (BII), $R_{24}$ to $R_{27}$ each independently include a hydrogen atom, substituted or unsubstituted alkyl, substituted or unsubstituted alkoxy, or an ether group, and at least one of $R_{24}$ to $R_{27}$ includes substituted or unsubstituted alkoxy or an ether group.

Optionally, $R_{24}$ to $R_{27}$ each independently include a hydrogen atom, substituted or unsubstituted C1-C10 alkyl, substituted or unsubstituted C1-C10 alkoxy or an ether group.

In some embodiments, the first ether polymer comprises at least one of the structural units represented by formula (BII-1) to the structural units represented by formula (BII-7), Formula (BII-1)

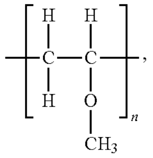

Formula (BII-2)

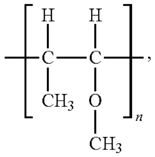

Formula (BII-3)

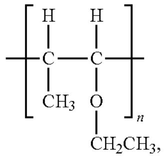

Formula (BII-4)

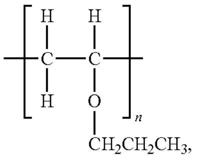

Formula (BII-5)

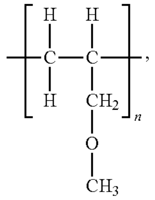

Formula (BII-6)

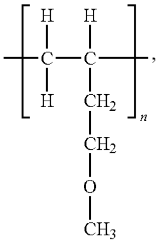

Formula (BII-7)

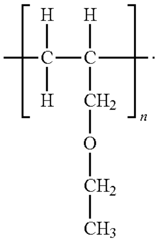

The above polymers are only examples of structural groups of main molecular chains. In the embodiments of the present application, the polymer can also be obtained by copolymerizing the above-mentioned structural groups with a small amount of other types of structural groups (such as olefin structural units, ester monomers, nitrile monomers such as acrylonitrile, amide monomers such as acrylamide, acrylic acid structural units).

When the above groups are substituted, the substituent may include one or more of cyano (—CN), nitro, sulfo, sulfonyl, amido, carboxyl, an ester group, a halogen atom.

In some embodiments, the molecular weight of the swollen polymer is $2\times10^5$ g/mol to $1.2\times10^6$ g/mol.

The present application can adjust at least one of the swelling rate and the compression modulus of the swellable polymer by adjusting the molecular weight.

Exemplarily, the molecular weight of the polymer can be $2\times10^5$ g/mol, $5\times10^5$ g/mol, $8\times10^5$ g/mol, $1\times10^6$ g/mol, $1.2\times10^6$ g/mol, or a range consisting of any two of the above numerical values.

[First Ester Polymer]

In some embodiments, the first ester polymer comprises a structural unit represented by formula (CI), Formula (CI)

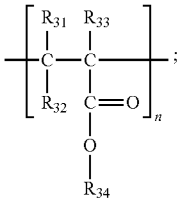

in formula (CI), $R_{31}$, $R_{32}$ and $R_{33}$ each independently include a hydrogen atom or substituted or unsubstituted alkyl; $R_{34}$ includes substituted or unsubstituted alkyl or substituted or unsubstituted hydroxyalkyl.

Optionally, $R_{31}$, $R_{32}$ and $R_{33}$ each independently include a hydrogen atom, or substituted or unsubstituted C1-C10 alkyl.

In some embodiments, $R_{34}$ includes substituted or unsubstituted C1-C10 alkyl, or substituted or unsubstituted C1-C10 hydroxyalkyl.

In some embodiments, $R_{31}$ includes a hydrogen atom, or substituted or unsubstituted methyl.

In some embodiments, $R_{32}$ and $R_{33}$ each independently include a hydrogen atom.

In some embodiments, when substituted, the substituent may include one or more of cyano (—CN), nitro, sulfo, sulfonyl, amido, carboxyl, an ester group, a halogen atom.

Exemplarily, the first ester polymer comprises at least one of the structural units represented by formula (CI-1) to the structural units represented by formula (CI-15)

Formula (CI-1)

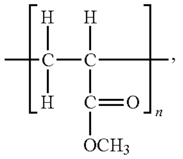

Formula (CI-2)

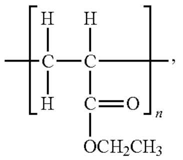

-continued

Formula (CI-3)
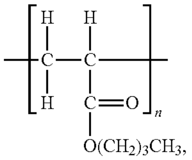

Formula (CI-4)
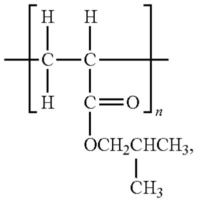

Formula (CI-5)
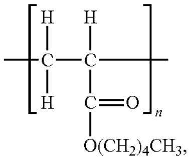

Formula (CI-6)
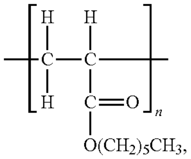

Formula (CI-7)
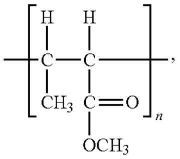

Formula (CI-8)
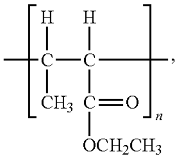

Formula (CI-9)
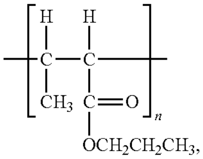

Formula (CI-10)
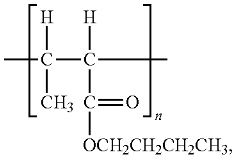

Formula (CI-11)
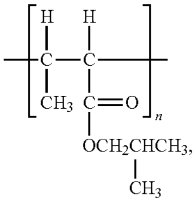

-continued

Formula (CI-12)
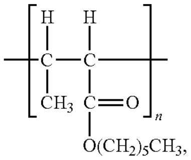

Formula (CI-13)
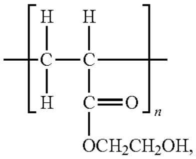

Formula (CI-14)
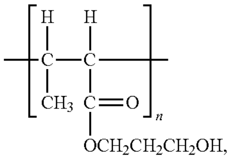

Formula (CI-15)
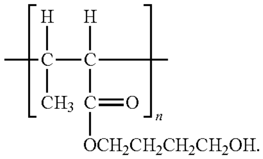

In some embodiments, the ester polymer includes a structural unit represented by formula (CII), Formula (CII)
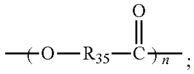

in the formula (CII), $R_{35}$ includes substituted or unsubstituted methylene.

Optionally, $R_{35}$ includes substituted or unsubstituted C1-C10 methylene.

Exemplarily, the first ester polymer comprises at least one of the structural units represented by formula (CII-1) to the structural units represented by formula (CII-5), Formula (CII-1)
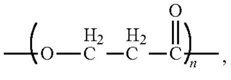

Formula (CII-2)
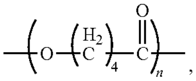

Formula (CII-3)
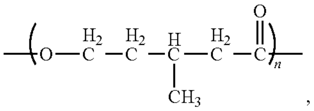

Formula (CII-4)
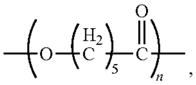

and

-continued (CII-5)

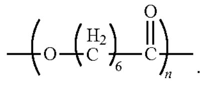

In some embodiments, the first ester polymer includes a compound represented by formula (CIII), Formula (CIII)

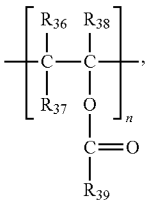

in formula (CIII), $R_{36}$, $R_{37}$ and $R_{38}$ each independently include a hydrogen atom, or substituted or unsubstituted C1-C8 alkyl; $R_{39}$ includes substituted or unsubstituted C1-C8 alkyl;

optionally, $R_{36}$, $R_{37}$ and $R_{38}$ each independently include a hydrogen atom, substituted or unsubstituted C1-C4 alkyl.

Exemplarily, the ester polymer includes at least one of the compounds represented by formula (CIII-1) to the compounds represented by formula (CIII-5), Formula (CIII-1)

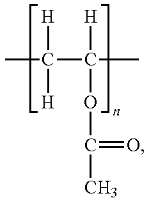

Formula (CIII-2)

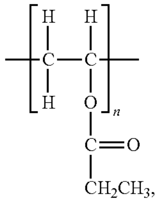

Formula (CIII-3)

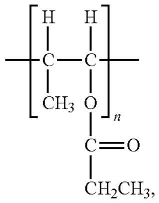

Formula (CIII-4)

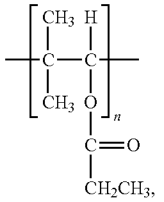

-continued

Formula (CIII-5)

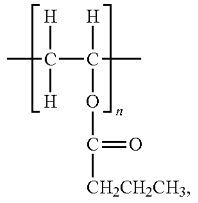

Formula (CIII-6)

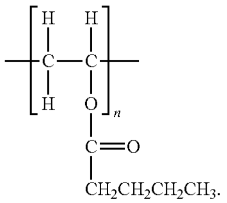

The above polymers are only examples of structural groups of main molecular chains. In the embodiments of the present application, the polymer can also be obtained by copolymerizing the above-mentioned structural groups with a small amount of other types of structural groups (such as olefin structural units, ester monomers, nitrile monomers such as acrylonitrile, amide monomers such as acrylamide, acrylic acid structural units).

When the above groups are substituted, the substituent may include one or more of cyano (—CN), nitro, sulfo, sulfonyl, amido, carboxyl, an ester group, a halogen atom.

In some embodiments, the molecular weight of the swollen polymer is $2\times10^5$ g/mol to $1.2\times10^6$ g/mol.

The present application can adjust at least one of the swelling rate and the compression modulus of the swellable polymer by adjusting the molecular weight.

Exemplarily, the molecular weight of the polymer can be $2\times10^5$ g/mol, $5\times10^5$ g/mol, $8\times10^5$ g/mol, $1\times10^6$ g/mol, $1.2\times10^6$ g/mol, or a range consisting of any two of the above numerical values.

In some embodiments, the coating 712 may further comprise a heat-resistant filler, thereby improving the heat-resistant performance of the separator 7 as a whole.

In some embodiments, the separator 7 may further comprise a heat-resistant coating 712, the heat-resistant coating 712 is located between the second porous substrate film 711 and the coating 712, and the heat-resistant coating 712 comprises a heat-resistant filler.

In some embodiments, the decomposition temperature of the filler may be above 200° C., so that the filler has good thermal stability and is difficult to decompose, thereby further improving the heat resistance of the separator 7.

Inorganic particles have high thermal stability and are not easy to decompose. Optionally, the inorganic particles include at least one of inorganic particles having a dielectric constant greater than 5, inorganic particles having ion conductivity but not storing ions, and inorganic particles capable of undergoing electrochemical reactions.

Optionally, the inorganic particles having a dielectric constant greater than 5 include at least one of boehmite, aluminum oxide, zinc oxide, silicon oxide, titanium oxide, zirconium oxide, barium oxide, calcium oxide, magnesium oxide, nickel oxide, tin oxide, cerium oxide, yttrium oxide, hafnium oxide, aluminum hydroxide, magnesium hydroxide, silicon carbide, boron carbide, aluminum nitride, silicon nitride, boron nitride, magnesium fluoride, calcium fluoride, barium fluoride, barium sulfate, magnesium aluminum silicate, lithium magnesium silicate, sodium magnesium silicate, bentonite, hectorite, zirconium titanate, barium titanate, $Pb(Zr,Ti)O_3$ (abbreviated as PZT), $Pb_{1-m}La_mZr_{1-n}Ti_nO_3$ (abbreviated as PLZT, 0<m<1, 0<n<1), $Pb(Mg_3Nb_{2/3})O_3$—$PbTiO_3$ (abbreviated as PMN-PT), and their respective modified inorganic particles. Optionally, the inorganic particles may be modified by chemical modification and/or physical modification. The chemical modification methods include coupling agent modification (e.g., using silane coupling agents, titanate coupling agents, etc.), surfactant modification, polymer grafting modification, etc. The physical modification methods may include mechanical dispersion, ultrasonic dispersion, high-energy treatment, and the like. Through modification treatment, the agglomeration of inorganic particles can be reduced, so that they can form a more stable and uniform spatial network structure with nanocellulose. In addition, coupling agents, surface active materials or polymers with specific functional groups are selected to modify inorganic particles, which also helps to improve the wetting properties of the coating 712 to the electrolyte solution and the binding strength between the coating 712 and the substrate.

Optionally, the inorganic particles having ion conductivity but not storing ions include at least one of $Li_3PO_4$, lithium titanium phosphate $Li_{x1}Ti_{y1}(PO_4)_3$, lithium aluminum titanium phosphate $Li_{x2}Al_{y2}Ti_{z1}(PO_4)_3$, $(LiAlTiP)_{x3}O_{y3}$ type glass, lithium lanthanum titanate $Li_{x4}La_{y4}TiO_3$, lithium germanium thiophosphate $Li_{x5}Ge_{y5}P_{z2}S_w$, lithium nitride $Li_{x6}N_{y6}$, $SiS_2$ type glass $Li_{x7}Si_{y7}S_{z3}$, and $P_2S_5$ type glass $Li_{x8}P_{y8}S_{z4}$, where 0<x1<2, 0<y1<3, 0<x2<2, 0<y2<1, 0<z1<3, 0<x3<4, 0<y3<13, 0<x4<2, 0<y4<3, 0<x5<4, 0<y5<1, 0<z2<1, 0<w<5, 0<x6<4, 0<y6<2, 0<x7<3, 0<y7<2, 0<<3<4, 0<x8<3, 0<y8<3, and 0<z4<7. This can further improve the ion transport properties of the separator 7.

The organic particles have good thermal stability and are not easy to decompose, thereby improving the heat resistance of the separator 7; at the same time, when the internal temperature of the battery cell reaches the melting point of the organic particles due to overcharge abuse, thermal abuse, etc., the organic particles can also melt and be sucked into the micropores of the substrate due to capillary action to play a role in closing the pores and breaking the circuit, which helps to ensure that the battery cell has high safety performance.

In some embodiments, the organic particles include, but are not limited to, at least one of polyethylene particles, polypropylene particles, polystyrene particles, melamine resin particles, phenolic resin particles, polyester particles (e.g., polyethylene terephthalate, polyethylene naphthalate, polybutylene terephthalate), polyimide particles, polyamideimide particles, polyaramid particles, polyphenylene sulfide particles, polysulfone particles, polyethersulfone particles, polyetheretherketone particles, polyaryletherketone particles, copolymers of butyl acrylate and ethyl methacrylate (e.g., cross-linked polymers of butyl acrylate and ethyl methacrylate).

Battery Cell

In a first aspect, the present application provides a battery cell, the battery cell comprises an electrode assembly and an electrolyte solution, the electrode assembly comprises the separator according to any embodiment of the first aspect of the present application.

In some embodiments, the battery cell satisfies: $V_0/(m/\rho)\geq 1$;

$V_0$ represents the numerical values of pore volume and interlayer gap volume in the electrode assembly in mL;

m represents the numerical value of difference between the mass of the battery cell before oven drying and the mass after oven drying in g;

ρ represents the numerical value of density of the electrolyte solution in g/mL.

When the battery cell in the embodiments of the present application satisfies the above formula, there can be sufficient space in the electrode assembly 52 to provide a liquid storage space for the electrolyte solution, thereby reducing the risk of the electrolyte solution flowing out of the electrode assembly 52 and improving the cycling performance of the battery cell.

Figure 7:
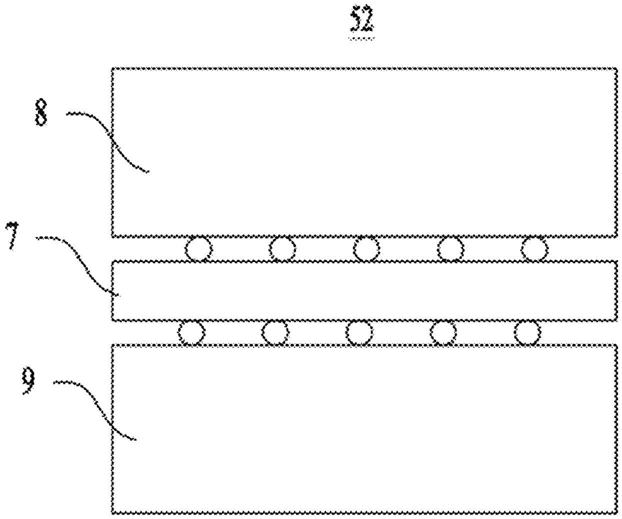
FIG. 7 is a schematic diagram of an embodiment of an electrode assembly of a battery cell of the present application.
Figure 8:
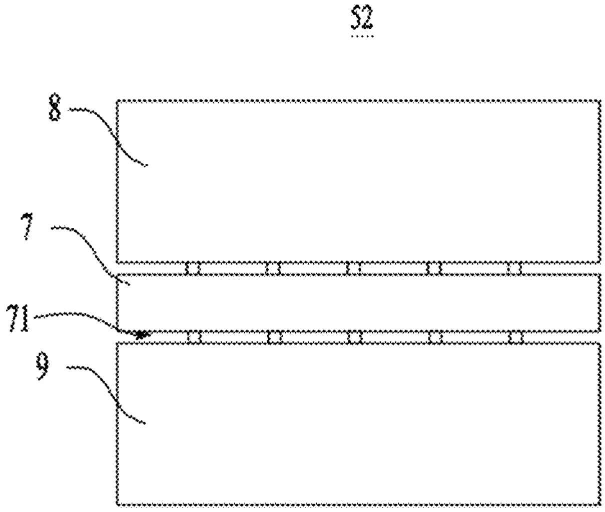
FIG. 8 is a schematic diagram of another embodiment of an electrode assembly of a battery cell of the present application.

As shown in FIGS. 7 and 8, the electrode assembly 52 comprises a first electrode plate 8, a second electrode plate 9 and a separator 7. The first electrode plate 8 and the second electrode plate 9 are opposite in polarity, and the separator 7 is provided between the first electrode plate 8 and the second electrode plate 9; the first electrode plate 8 has a pore structure, the second electrode plate 9 has a pore structure, and the separator 7 also has a pore structure. The pore volume of the electrode assembly 52 is the sum of the pore structure volume of the first electrode plate 8, the pore structure volume of the second electrode plate 9 and the pore structure volume of the separator 7. The interlayer gap volume of the electrode assembly 52 is the sum of the gap volume between the first electrode plate 8 and the separator 7, and the gap volume between the second electrode plate 9 and the separator 7. Generally speaking, the interlayer gap volume of the electrode assembly 52 is relatively small; however, in the embodiments of the present application, since the separator 7 has certain compressibility, during the charge and discharge process of the battery cell, the separator 7 undergoes a certain degree of deformation, which will increase the gap volume between the separator 7 and the electrode plate.

$V_0$ can be considered to be equal to the sum of the pore volume V1 of the first electrode plate 8, the pore volume V2 of the second electrode plate 9, the pore volume of the separator and the interlayer gap volume V3, that is, $V_0=V1+V2+V3$.

$$V3 = S\times(D0-d1-d2)\times(1-\Delta V);$$

wherein S represents the facing area of the first electrode plate 8 and the second electrode plate 9;

D0 represents the total thickness of the electrode assembly 52;

d1 represents the thickness of the first electrode plate 8;

d2 represents the thickness of the second electrode plate 9;

ΔV represents the compression rate of the separator.

Figure 9:
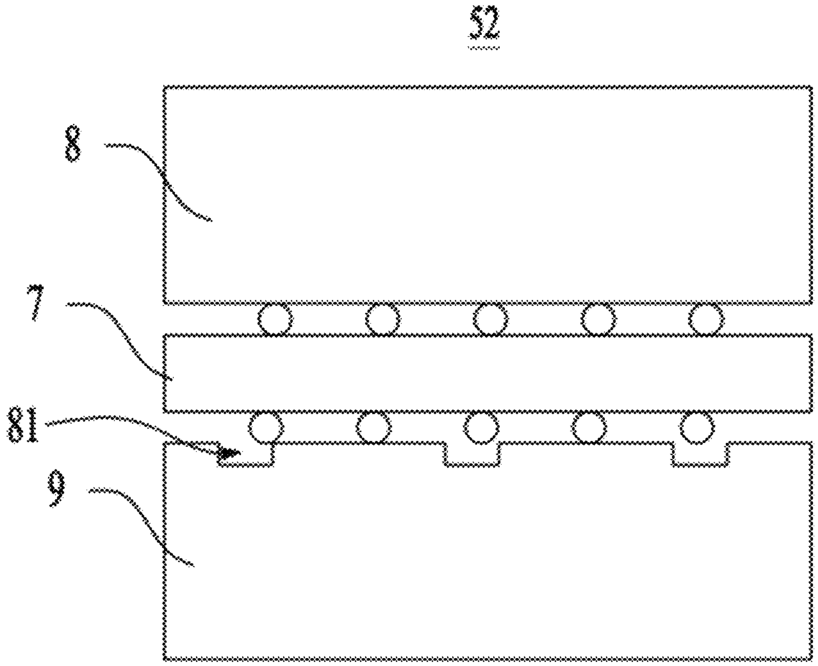
FIG. 9 is a schematic diagram of another embodiment of an electrode assembly of a battery cell of the present application.

As shown in FIG. 9, further, when the surface of the first electrode plate 8 comprises a second recessed area 81 (groove), the gap volume of the electrode assembly 52 needs to further incorporate the total volume of the second recessed area 81. Specifically, V3 also includes the total volume of the second recessed area 81.

Further, when the surface of the second electrode plate 9 comprises a second recessed area 81 (groove), the gap volume of the electrode assembly 52 needs to further incorporate the total volume of the second recessed area 81. Specifically, V3 also includes the total volume of the second recessed area 81.

The first electrode plate 8 can be a positive electrode plate, and correspondingly, the second electrode plate 9 can be a negative electrode plate; or the first electrode plate 8 can be a negative electrode plate, and correspondingly, the second electrode plate 9 can be a positive electrode plate.

m can be understood as the total amount of the electrolyte solution in the battery cell. After the electrolyte solution is injected into the battery cell, the electrolyte solution mainly exists in the following forms: first, it is adsorbed in the pore structure of the electrode plate and/or the separator 7, and second, it diffuses into the swellable polymer. The total amount of the electrolyte solution can be measured by the following method: a fresh battery cell is taken and fully discharged to 0% SOC state of charge, the battery cell is weighed, and the weighed mass is the mass of the battery cell before oven drying; a hole with a diameter of φ5-8 mm is cut out at a local position of the battery cell, and the battery cell is placed above a container with the hole facing downward and directly above the container, so that the free electrolyte solution inside the battery cell can drip into the container below. The battery cell is allowed to stand still in this way for 3 h to 5 h so that all the free electrolyte solution that may be present inside can drip into the container. Of course, there may be no free electrolyte solution. Then, the battery cell is oven dried at 60° C. to 95° C. for 24 to 48 h, the battery cell is immersed in dimethyl carbonate DMC solvent for 12 h, and the battery cell is then oven dried at 60° C. to 95° C. for 24 to 48 h. The oven dried battery cell is weighed, and the weighed mass is the mass of the battery cell after oven drying. For example, the battery cell is oven dried at 60° C. for 5 h, and the oven dried battery cell is weighed. In the embodiments of the present application, the fresh battery cell may be a battery cell that has just left the factory (not subjected to charge and discharge cycles after formation), or a battery cell that is mounted on an electrical apparatus and has been cycled less than 10 times.

In the embodiments of the present application, when there is free electrolyte solution in the battery cell, the density p of the electrolyte solution can be measured by the following method: a plurality of, for example 10, battery cells in the battery can be taken, a predetermined mass of the electrolyte solution can be poured out, and the volume of the electrolyte solution poured out can be measured. The ratio of the predetermined mass to the volume is the density p of the electrolyte solution. In the case where there is no free electrolyte solution in the battery cell, the density p of the electrolyte solution is the density of the electrolyte solution injected into the battery cell.

When the battery cell meets the above range, the electrode assembly 52 can provide space for the electrolyte solution to occupy, which is conducive to the electrolyte solution being completely located inside the electrode assembly 52, reducing the risk of the electrolyte solution being free outside the electrode assembly 52, and improving the operational reliability and cycling performance of the battery cell.

Optionally, $V_0/(m/\rho)\geq 1$; $V_0/(m/\rho)\geq 1.2$; $V_0/(m/\rho)\geq 1.5$; $V_0/(m/\rho)\geq 1.8$; $V_0/(m/\rho)>2.0$; $V_0/(m/\rho)>2.2$; $V_0/(m/\rho)>2.5$; $V_0/(m/\rho)\geq 2.8$; or $V_0/(m/\rho)\geq 3$, etc.

In some embodiments, the first electrode plate 8 comprises two surfaces opposite to each other along its own thickness direction, which can also be understood as the surface of the first electrode plate 8 facing toward the separator 7. At least one of the two surfaces has at least one second recessed area 81, that is, one of the two surfaces has at least one second recessed area 81, or both surfaces have at least one second recessed area 81.

The second recessed area 81 refers to the space formed by a portion of the surface of the first electrode plate 8 being recessed toward the inside of the first electrode plate 8. The second recessed area 81 can also serve as a liquid storage space for the electrolyte solution. When the volume of the battery cell expands, components in the electrode assembly 52, such as the separator 7, are subjected to a certain extrusion force, the electrolyte solution locked in the polymer may be squeezed out, and the electrolyte solution flows to the second recessed area 81, thereby reducing the risk of the electrolyte solution flowing out of the electrode assembly 52 and achieving good and uniform infiltration of the electrode assembly 52.

Exemplarily, the first electrode plate 8 may be a positive electrode plate, that is, the surface of the positive electrode plate has at least one second recessed area 81. Correspondingly, the second electrode plate 9 may be a negative electrode plate, and the surface of the negative electrode plate may have at least one second recessed area 81; of course, the surface of the negative electrode plate may also be a flat surface, that is, the surface of the negative electrode plate does not have the second recessed area 81.

Exemplarily, the first electrode plate 8 may be a negative electrode plate, that is, the surface of the negative electrode plate has at least one second recessed area 81. Correspondingly, the second electrode plate 9 may be a positive electrode plate, and the surface of the positive electrode plate may be a flat surface, that is, the surface of the negative electrode plate does not have the second recessed area 81.

The number of the second recessed area 81 may be one or more.

The specific configuration of the second recessed area 81 is as described in the first recessed area, and will not be repeated here.

In some embodiments, the projection of the first recessed area along the thickness direction of the electrode assembly 52 overlaps with the projection of the second recessed area 81 along the thickness direction of the electrode assembly 52. In this case, it can also be understood that the first recessed area can be provided opposite to the second recessed area 81. After being released from the swellable polymer, the electrolyte solution can flow into the liquid storage space formed by the first recessed area and the second recessed area 81, further reducing the risk of the electrolyte solution flowing out of the electrode assembly 52.

In some other embodiments, the projection of the first recessed area along the thickness direction of the electrode assembly 52 does not overlap with the projection of the second recessed area 81 along the thickness direction of the electrode assembly 52. In this case, it can also be understood that the first recessed area can be provided staggered with the second recessed area 81. The second recessed area 81 is provided opposite to the protruding surface of the separator 7 (the protruding surface corresponds to the first recessed area). The protruding surface has a large amount of swellable polymers with the electrolyte solution locked in it. When the battery cell expands in volume, the electrolyte solution is released. Part of the electrolyte solution flows into the second recessed area 81 corresponding to the protruding surface, and the other part of the electrolyte solution flows along the separator 7 into the first recessed area, further reducing the risk of the electrolyte solution flowing out of the electrode assembly 52.

In some further embodiments, there are a plurality of first recessed areas 71 and a plurality of second recessed areas 81. For example, the first recessed area 71 comprises a recessed area a and a recessed area b, and the second recessed area 81 comprises a recessed area c and a recessed area d. The recessed area a is provided opposite to the recessed area c, and the recessed area b is provided staggered with the recessed area d.

In some embodiments, the electrolyte solution is located inside the electrolyte assembly 52.

The electrolyte solution has fluidity, which makes it easier for it to flow around the active material particles, thereby increasing the transmission rate of active ions. In the related art, the electrolyte solution usually has the following forms in the battery cell: first, it diffuses into the pore structure of the electrode assembly 52, for example, it is located in the pores of the electrode plate and/or the separator 7; second, it is free in the battery cell. The electrolyte solution in the embodiments of the present application has the following forms: first, it diffuses into the pore structure of the electrode assembly 52, such as in the pores of the electrode plate and/or the separator 7; second, it is located in the gap structure of the electrode assembly 52, such as the gap space between the first electrode plate 8 and the separator 7, and the gap space between the second electrode plate 9 and the separator 7; third, it diffuses into the swellable polymer, so that the electrolyte solution in the embodiments of the present application is basically all located inside the electrode assembly 52, and there is basically no free electrolyte solution in the battery cell, which can significantly improve the operational reliability and cycling performance of the battery cell.

In some embodiments, the battery cell further satisfies: $0 \le y/V_{total\ pore\ space} \le 15\%$;

- y represents the numerical value of volume of free electrolyte solution in the battery cell in mL;
- $V_{total\ pore\ space}$ represents the numerical value of pore volume of the electrode assembly 52 in mL.

When calculating a formula, only the numerical value therein rather than the unit is put into calculation.

When the battery cell meets the above conditions, the content of free electrolyte solution in the battery cell is extremely small, or even substantially no free electrolyte solution is contained in the battery cell, thereby significantly improving the operational reliability and cycling performance of the battery cell.

Exemplarily, $y/V_{total\ pore\ space}$ may be 0%, 1%, 2%, 3%, 4%, 5%, 6%, 7%, 8%, 9%, 10%, 11%, 12%, 13%, 14%, 15%, or a range consisting of any two of the above numerical values. $y/V_{total\ pore\ space}$ is 0, indicating that the amount of free electrolyte solution is 0 mL, that is, there is basically no free electrolyte solution in the battery cell.

The electrode assembly 52 comprises a first electrode plate 8, a second electrode plate 9 and a separator 7. The pore volume $V_{total\ pore\ space}$ of the electrode assembly 52 includes the sum of the pore volume of the first electrode plate 8, the pore volume of the second electrode plate 9 and the pore volume of the separator 7. In the embodiments of the present application, the pore volume has a meaning well known in the art and can be detected by using devices and methods well known in the art. For example, it can be obtained by the gas displacement method. The pore volume is (v-m), wherein v represents the apparent volume (i.e. the total volume), and m represents the real volume.

In some embodiments, the battery cell satisfies: $(m/\rho)/V_{total\ pore\ space} \ge 80\%$;

- $V_{total\ pore\ space}$ represents the pore volume of the electrode assembly 52 in mL;
- m represents the difference between the mass of the battery cell before oven drying and the mass after oven drying in g.

ρ represents the density of the electrolyte solution in g/mL.

In the embodiments of the present application, m can be understood as the total amount of the electrolyte solution in the battery cell, and the specific testing method is as described above.

When the battery cell meets the above conditions, most of the electrolyte solution is located in the pore structure of the electrode assembly 52, that is, the electrode assembly 52 itself has good liquid absorption and liquid retention capabilities, which is conductive to the transmission of active ions and improves the kinetic performance of the battery cell; a small part of the electrolyte solution can diffuse into the swellable polymer and be released during the battery cell's cyclic charge and discharge process. Since the amount of release is relatively small, the electrolyte solution is not easy to flow out of the electrode assembly 52, and the electrolyte solution can infiltrate the electrode assembly 52 more uniformly, thereby improving the cycling performance of the battery cell.

Exemplarily, $(m/\rho)/V_{total\ pore\ space} \ge 80\%$, $(m/\rho)/V_{total\ pore\ space} \ge 82\%$, $(m/\rho)/V_{total\ pore\ space} \ge 85\%$, $(m/\rho)/V_{total\ pore\ space} \ge 86\%$, $(m/\rho)/V_{total\ pore\ space} \ge 88\%$, $(m/\rho)/V_{total\ pore\ space} \ge 90\%$, $(m/\rho)/V_{total\ pore\ space} \ge 92\%$ or $(m/\rho)/V_{total\ pore\ space} \ge 95\%$.

In some embodiments, the battery cell further satisfies: $0 \le y/Ah \le 15\%$;

- y represents the numerical value of volume of free electrolyte solution in the battery cell in mL;
- Ah represents the numerical value of nominal capacity of the battery cell in Ah.

When calculating a formula, only the numerical value therein rather than the unit is put into calculation.

The volume y (mL) of free electrolyte solution can be measured by the following method: a fresh battery cell is taken and fully discharged to 0% SOC state of charge; a hole with a diameter of φ5-8 mm is cut out at a local position of the battery cell, and the battery cell is placed above a container with the hole facing downward and directly above the container, so that the free electrolyte solution inside the battery cell can drip into the container below. The battery cell is allowed to stand still in this way for 3 h to 5 h so that all the free electrolyte solution inside can drip into the container. Of course, the volume of the electrolyte solution in the container is measured to give y. In the embodiments of the present application, the fresh battery cell may be a battery cell that has just left the factory (not subjected to charge and discharge cycles after formation), or a battery cell that is mounted on an electrical apparatus and has been cycled less than 10 times.

When the battery cell meets the above conditions, the content of free electrolyte solution in the battery cell is extremely small, or even substantially no free electrolyte solution is contained in the battery cell, thereby significantly improving the operational reliability and cycling performance of the battery cell.

Exemplarily, y/Ah may be 0%, 1%, 2%, 3%, 4%, 5%, 6%, 7%, 8%, 9%, 10%, 11%, 12%, 13%, 14%, 15%, or a range consisting of any two of the above numerical values. y/Ah is 0, indicating that the amount of free electrolyte solution is 0 mL, that is, there is basically no free electrolyte solution in the battery cell.

In some embodiments, after the linear frequency sweep vibration test, the battery cell is charged to 100% state of charge (SOC), a hole is opened on the battery cell, the hole is provided at the lowest site in the vertical direction, and the volume of the electrolyte solution flowing out of the battery cell is recorded as M1, $0\ mL \le M1 \le 0.5\ mL$, and optionally, M1 is 0 mL;

wherein the vibration direction of the linear frequency sweep vibration test is: up-and-down single vibration;

the vibration frequency of the linear frequency sweep vibration test is: 10 Hz to 55 Hz;

the maximum acceleration of the linear frequency sweep vibration test is: 30 $m/s^2$;

the number of frequency sweep cycles of the linear frequency sweep vibration test is: 10 times;

the vibration time of the linear frequency sweep vibration test is: 3 h.

In the related art, during use, the battery cell may vibrate under the action of external force, and the electrolyte solution in the electrode assembly 52 may separate from the electrode assembly 52 under the action of vibration to form free electrolyte solution. The free electrolyte solution in the battery cell may leak, causing corrosion to the battery cell and leading to the risk of battery cell failure. The embodiments of the present application can effectively gather and throw out the electrolyte solution inside the battery cell by allowing the battery cell to stand still and vibrate, thereby more accurately determining whether there is flowing electrolyte solution between the case and the electrode assembly 52 of the battery cell and determining the content of free electrolyte solution. When the battery cell in the embodiments of the present application meets the above conditions, the content of free electrolyte solution in the battery cell is extremely small, or even substantially no free electrolyte solution is contained in the battery cell, thereby significantly improving the operational reliability and cycling performance of the battery cell.

Exemplarily, M1 may be 0 mL, 0.05 mL, 0.1 mL, 0.15 mL, 0.2 mL, 0.25 mL, 0.3 mL, 0.35 mL, 0.4 mL, 0.45 mL, 0.5 mL, or a range consisting of any two of the above numerical values. M1 is 0 mL, indicating that the amount of free electrolyte solution is 0, that is, after the battery cell is subjected to the linear frequency sweep vibration test, there is basically no free electrolyte solution inside.

In some embodiments, after the battery cell undergoes the above-mentioned linear frequency sweep vibration test, the case is removed, the electrode assembly is taken out for extrusion test, and the volume of the electrolyte solution flowing out of the electrode assembly is recorded as M2 (the extrusion equipment is elevated, and a weighing balance and an electrolyte solution collection container are set at the bottom), 0 mL≤M2≤0.5 mL, optionally, M2 is 0 mL;

wherein the extrusion direction of the extrusion test is: perpendicular to the thickness direction of the electrode assembly 52;

the extrusion degree of the extrusion test is: the extrusion pressure is 0.35 MPa.

In the related art, during use, the battery cell may be subjected to external extrusion, and the electrolyte solution in the electrode assembly 52 may separate from the electrode assembly 52 under the action of extrusion to form free electrolyte solution. The free electrolyte solution in the battery cell may leak, causing corrosion to the battery cell and leading to the risk of battery cell failure. The embodiments of the present application can effectively squeeze out the electrolyte solution inside the battery cell by subjecting the battery cell to the extrusion test, thereby more accurately determining whether there is flowing electrolyte solution between the case and the electrode assembly 52 of the battery cell and determining the content of free electrolyte solution. When the battery cell in the embodiments of the present application meets the above conditions, the content of free electrolyte solution in the battery cell after extrusion is extremely small, or even substantially no free electrolyte solution is contained in the battery cell, thereby significantly improving the operational reliability and cycling performance of the battery cell.

Exemplarily, M2 may be 0 mL, 0.05 mL, 0.1 mL, 0.15 mL, 0.2 mL, 0.25 mL, 0.3 mL, 0.35 mL, 0.4 mL, 0.45 mL, 0.5 mL, or a range consisting of any two of the above numerical values. M2 is 0 mL, indicating that the amount of free electrolyte solution is 0, that is, after the battery cell is subjected to the extrusion test, there is basically no free electrolyte solution inside.

In some embodiments, a voltage of 200V is provided to the battery cell to form a loop for 4 h, and an absolute value of temperature change of the battery cell is ≤4° C.

For example, the negative terminal and the shell of the battery cell are connected to a 200V voltage to form a current loop, the temperature fluctuation range of the battery cell is less than or equal to 4° C. within 4 h, and there is no failure behavior such as fire or explosion. Especially when the free electrolyte solution satisfies y=0, the temperature fluctuation range is small and the operational reliability of the battery cell is greatly improved.

In order to further improve the liquid absorption and storage capabilities of the electrode assembly 52, a liquid-retaining polymer may be added to at least one of the first electrode plate 8 and the second electrode plate 9.

In some embodiments, the first electrode plate 8 includes a current collector and a film layer provided on at least one surface of the current collector, and the film layer comprises a liquid-retaining polymer and active material particles. The liquid-retaining polymer may be provided only in the first electrode plate 8, or only in the second electrode plate 9, or the liquid-retaining polymer may be provided in both the first electrode plate 8 and the second electrode plate 9. The first electrode plate 8 can be a positive electrode plate, and correspondingly, the second electrode plate 9 can be a negative electrode plate; or the first electrode plate 8 can be a negative electrode plate, and correspondingly, the second electrode plate 9 can be a positive electrode plate.

As some examples, the liquid-retaining polymer is distributed on the surface of the active material particles; it can be understood that the active material particles and the binder are solidified into an active material layer on the surface of the current collector, and the liquid-retaining polymer is provided on the surface of the active material layer facing away from the current collector. Such a setting can make the electrolyte solution diffuse quickly between the molecular chains of the liquid-retaining polymer and be wrapped by the molecular chains, so as to form a gel-like substance on the surface of the active material particles and adhere to the surface of the active material particles to protect the active material particles. Thus, the active material particles and the electrolyte solution are closely connected, the solid-liquid interface performance is improved, the side reactions between the active material particles and the electrolyte solution can be reduced, and the reliability and electrical properties (such as cycling performance and storage performance) of the battery cell are improved.

Specifically, the preparation process of the electrode plate comprises:

adding active material particles into a solvent to prepare an active slurry;

applying the active slurry to the surface of the current collector and drying and solidifying it into an active material layer;

providing the liquid-retaining polymer onto the surface of the active material layer to form the electrode plate.

As some other examples, there are a plurality of active material particles, with pores between two adjacent active material particles, and the liquid-retaining polymer is distributed in the pores between the active material particles; this arrangement can improve the liquid storage capacity of the active material layer, that is, the ability to lock the electrolyte solution, thereby improving the reliability and electrical performance of the battery cell.

Specifically, the preparation process of an example of the electrode plate comprises:

dispersing a liquid-retaining polymer in a solvent to form a mixed system;

adding active material particles into the mixed system to prepare a slurry;

applying the slurry onto the surface of the current collector, and drying and solidifying it to form the electrode plate.

Specifically, the preparation process of another example of the electrode plate comprises:

dispersing a liquid-retaining polymer and active material particles in a solvent to prepare a slurry;

applying the slurry onto the surface of the current collector, and drying and solidifying it to form the electrode plate.

As some further examples, the liquid-retaining polymer is distributed on the surface of the active material particles, and the liquid-retaining polymer is distributed in the pores between the active material particles.

Specifically, the preparation process of an example of the electrode plate comprises:

dispersing a liquid-retaining polymer and active material particles in a solvent to prepare a slurry;

applying the slurry to the surface of the current collector and drying and solidifying it into an active material layer;

providing the liquid-retaining polymer onto the surface of the active material layer to form the electrode plate.

In some embodiments, the liquid-retaining polymer may include at least one of a second fluoropolymer, a second ether polymer, a second ester polymer, and a ketoaldehyde polymer. The liquid-retaining polymer and the electrolyte solution have good affinity. The electrolyte solution can quickly diffuse between the molecular chains of the liquid-retaining polymer and be wrapped by the molecular chains. After swelling and adsorption, an elastic porous sustained-release electrolyte is obtained. The sustained-release electrolyte can absorb the free electrolyte solution in the battery cell and reduce the presence of free electrolyte solution. Since the free electrolyte solution is locked, the risk of free electrolyte solution being squeezed out is reduced, thereby reducing the risk of short circuit between the positive and negative electrode plates caused by dendrite formation, thereby improving the operational reliability and cycling performance of the battery cell. In addition, the absorbed free electrolyte solution forms a new condensed electrolyte solution with the elastic porous sustained-release electrolyte, which can ensure that the electrolyte has a higher conductivity, thereby improving the electrical performance of the battery cell.

[Second Fluoropolymer]

In some embodiments, the liquid-retaining polymer includes a second fluoropolymer, wherein the crystallinity of the second fluoropolymer measured by differential scanning calorimetry is $X_{C1}$%, $0<X_{C1}\leq30$; and the melting temperature of the second fluoropolymer is $T_{m1}$, in ° C., $0<T_{m1}\leq140$.

Crystallization refers to the process in which atoms, ions or molecules in a material are arranged in a certain spatial order to form an orderly structure. The conformation of the polymer in the crystallization is determined by both intramolecular and intermolecular factors. The intermolecular force will affect the stacking density between molecular chains. The crystallinity $X_{C1}$% is used to characterize the degree of crystallization in the material, which can be measured by differential scanning calorimetry DSC. Specifically, the test steps are as follows: 0.5 g to 0.8 g of a sample is taken, placed in a carrier crucible, and subjected to heating and cooling treatment in a nitrogen atmosphere; the sample is heated from an initial temperature 20° C. lower than the intrinsic $T_{g1}$ of the material to a cutoff temperature 20° C. higher than the intrinsic $T_{m1}$ of the material at a heating rate of 10° C./min, and the actual glass transition temperature $T_{g1}$ and melting temperature $T_{m1}$ of the material are determined according to the endothermic and exothermic peak or transition point of the material in the process.

As a result, the second fluoropolymer has a relatively low crystallinity and melting temperature, so that the molecular chain arrangement tends to be loose, the interaction force between the molecular chains is small, the adjacent molecular chains are easily opened, and the chain segment movement is achieved through intermolecular internal rotation, forming a molecular chain structure with high flexibility; and the second fluoropolymer and the electrolyte solution in the battery cell can form a gel-like substance, thereby improving the operational reliability and cycling performance of the battery cell.

Exemplarily, the crystallinity $X_{C1}$% of the second fluoropolymer measured by differential scanning calorimetry may be 5%, 10%, 15%, 20%, 25%, 30%, or a range consisting of any two of the above numerical values.

Exemplarily, the melting temperature of the second fluoropolymer may be 10° C., 20° C., 50° C., 70° C., 90° C., 100° C., 120° C., 140° C., or a range consisting of any two of the above numerical values.

In some embodiments, the second fluoropolymer has a glass transition temperature of $T_{g1}$, in ° C., $-150\leq T_{g1}\leq60$.

The glass transition temperature is the transition temperature of the polymer chain segments from freezing to movement. The glass transition temperature has a certain influence on the flexibility of the polymer molecular chain. The lower the glass transition temperature, the better the flexibility of the polymer molecular chain at room temperature. The higher the glass transition temperature, the worse the flexibility of the molecular chain at room temperature. The glass transition temperature can be measured by differential scanning calorimetry (DSC). The glass transition temperature of the polymer is relatively low, the molecular chain segments are more flexible, and adjacent molecular chains are easier to open. Exemplarily, the glass transition temperature of the second fluoropolymer may be −150° C., −120° C., −100° C., −80° C., −60° C., −30° C., 0° C., 30° C., 60° C., or a range consisting of any two of the above numerical values.

The structural unit of the second fluoropolymer is as shown in the structural unit of the above first fluoropolymer, but the substituents of the side chains of the two are not completely the same.

In some embodiments, the second fluoropolymer comprises at least one of the structural units represented by formula (AI) to the structural units represented by formula (AIII), Formula (AI)

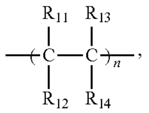

Formula (AII)

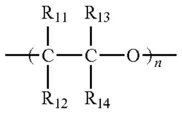

in formula (AI) and formula (AII), $R_{11}$, $R_{12}$, $R_{13}$ and $R_{14}$ each independently include a hydrogen atom, a fluorine atom, a chlorine atom, substituted or unsubstituted C1-C3 alkyl or substituted or unsubstituted C1-C3 alkoxy, and at least one of $R_{11}$, $R_{12}$, $R_{13}$ and $R_{14}$ includes a fluorine atom;

when substituted, the substituent may include one or more of cyano (—CN), nitro, sulfo, sulfonyl, amido, carboxyl, an ester group, a halogen atom.

Formula (AIII)

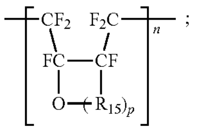

in formula (AIII), $R_{15}$ includes a single bond, substituted or unsubstituted C1-C3 alkyl; when substituted, the substituent includes a fluorine atom.

In some embodiments, p is a positive integer selected from 1 to 3.

In some embodiments, the degree of polymerization n of the second fluoropolymer is selected from a positive integer ranging from 1000 to 30000.

In some embodiments, $R_{11}$, $R_{12}$, $R_{13}$ and $R_{14}$ each independently include a hydrogen atom, a fluorine atom, a chlorine atom, substituted or unsubstituted C1-C2 alkyl, or substituted or unsubstituted C1-C2 alkoxy; further optionally, $R_{11}$, $R_{12}$, $R_{13}$ and $R_{14}$ each independently include a hydrogen atom, a fluorine atom, a chlorine atom, methyl, fluoromethyl, methoxy or perfluoromethoxy.

In some embodiments, when substituted, the substituent may include one or more of cyano (—CN), nitro, sulfo, sulfonyl, amido, carboxyl, an ester group, a halogen atom.

In some embodiments, the second fluoropolymer comprises at least one of the structural units represented by formula (AI-1) to the structural units represented by formula (AI-11), Formula (AI-1)

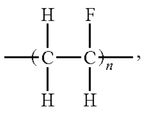

Formula (AI-2)

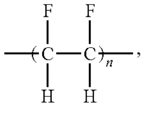

-continued

Formula (AI-3)

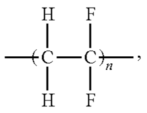

Formula (AI-4)

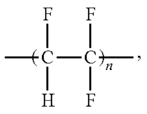

Formula (AI-5)

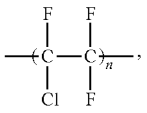

Formula (AI-6)

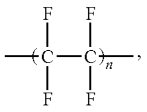

Formula (AI-7)

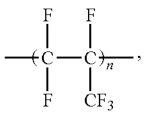

Formula (AI-8)

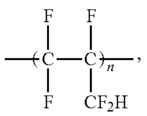

Formula (AI-9)

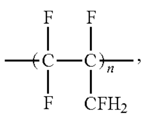

Formula (AI-10)

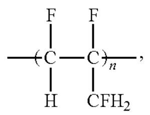

Formula (AI-11)

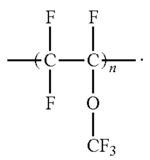

In some embodiments, the second fluoropolymer comprises at least one of the structural units represented by formula (AII-1) to the structural units represented by formula (AII-5), Formula (AII-1)

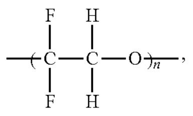

Formula (AII-2)

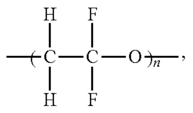

-continued

Formula (AII-3)

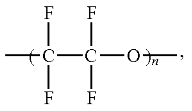

Formula (AII-4)

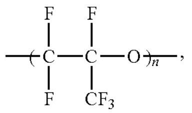

Formula (AII-5)

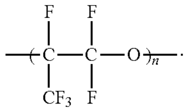

In some embodiments, the second fluoropolymer comprises at least one of the structural units represented by formula (AIII-1) to the structural units represented by formula (AIII-3), Formula (AIII-1)

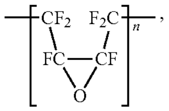

Formula (AIII-2)

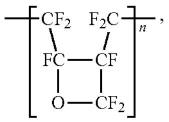

Formula (AIII-3)

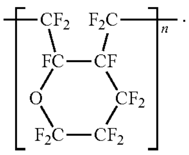

Exemplarily, the second fluoropolymer includes one or more of polyperfluoroethylene (PTFE), polyvinylidene fluoride (PVDF), a perfluoroethylene propylene copolymer (FEP), a perfluoroalkoxy polymer (PFA), perfluoropolyether (PFPE), a polyvinylidene fluoride-hexafluoropropylene copolymer (PVDF-HFP), a polyvinylidene fluoride-trifluoroethylene copolymer (PVDF-TrFE) and perfluoro (1-butenyl vinyl ether) polymer (CYTOP for short).

Optionally, the second fluoropolymer includes one or more of polyperfluoroethylene (PTFE), polyvinylidene fluoride (PVDF), a perfluoroethylene propylene copolymer (FEP), a polyvinylidene fluoride-hexafluoropropylene copolymer (PVDF-HFP), and a polyvinylidene fluoride-trifluoroethylene copolymer (PVDF-TrFE).

The aforementioned second fluoropolymer may be derived from one or more of the following monomers: fluorinated cyclic hydrocarbon monomer, vinyl fluoride, 1,2-difluoroethylene, vinylidene fluoride, trifluoroethylene, chlorotrifluoroethylene, tetrafluoroethylene, hexafluoropropylene, 3,3,3-trifluoropropylene, trifluoropropylene, tetrafluoropropylene, pentafluoropropylene, and the like. Optionally, the fluoropolymer may be derived from at least two of the following monomers: fluorinated cyclic hydrocarbon monomer, vinyl fluoride, 1,2-difluoroethylene, vinylidene fluoride, trifluoroethylene, chlorotrifluoroethylene, tetrafluoroethylene, hexafluoropropylene, 3,3,3-trifluoropropylene, trifluoropropylene, tetrafluoropropylene, pentafluoropropylene.

The monomers used in the above-mentioned second fluoropolymer are all short-chain monomers, which are conducive to polymerization to form a straight-chain linear structure or a short-chain branched structure. This type of structure has a low degree of entanglement, which is conducive to improving the flexibility of the molecular chain. The molecular chain can fully stretch in the electrolyte solution, thereby further improving the interfacial performance of the active substance.

In some embodiments, the degree of polymerization n of the second fluoropolymer is selected from a positive integer ranging from 5000 to 20000.

In some embodiments, the molecular weight of the liquid-retaining polymer is $2\times10^5$ g/mol to $1.5\times10^6$ g/mol.

When the molecular weight of the liquid-retaining polymer is within the above range, the interaction between the molecular chains is relatively weak, which helps the solvent molecules in the electrolyte to open the molecular chains and enter between the molecular chains, thereby helping the active ions to enter the active material through the solvent, and achieving smooth and rapid migration of the active ions. Exemplarily, the molecular weight of the polymer can be $2\times10^5$ g/mol, $5\times10^5$ g/mol, $8\times10^5$ g/mol, $1\times10^6$ g/mol, $1.5\times10^6$ g/mol, or a range consisting of any two of the above numerical values.

[Second Ether Polymer]

In some embodiments, the liquid-retaining polymer includes a second ether polymer, and the second ether polymer is made into a sheet structure; the sheet structure is subjected to the dynamic frequency sweep test at ($T_{m2}$+20° C.) to obtain an elastic modulus G'-energy loss modulus G" curve, the slope of the elastic modulus G'-energy loss modulus G" curve is $K_1$, $1<K_1<\infty$, and $T_{m2}$° C. represents the melting temperature of the second ether polymer.

Specifically, the preparation process of the sheet structure is as follows: the second ether polymer is dried under vacuum at 80° C. for 12 h. The dried ether polymer is hot pressed into a thin sheet by a flat vulcanizer. The hot pressing temperature is set to be ($T_{m2}$+20° C.), the calendering thickness is 1-2 mm, the calendering time is 2 min, and the pressure is 8 MPa. After calendering for 2 min, the sample is taken out and placed on another vulcanizer of the same model for cold pressing at a pressure of 10 MPa. With a round die with a diameter of 25 mm, polymer discs (sheet structures) of fixed size can be obtained. For example, the sheet structure may be a disc with a thickness of 1-2 mm and a diameter of 25 mm; or the sample may be prepared according to the sample standard required by the testing device.

According to the conclusions of classical linear viscoelasticity, for polymers, especially linear polymers, the elastic modulus G'-dissipation modulus G" in the terminal region (the interval approaching the maximum angular velocity) of the elastic modulus G'-dissipation modulus G" curve conforms to the frequency dependence, and the longest chain of the polymer plays a role in the viscoelastic behavior.

The specific steps of the dynamic frequency sweep test are as follows: The dynamic frequency sweep test is performed using a TA-AR2000EX rotational rheometer (TA Instruments, USA) with a parallel plate having a diameter of 25 mm and a thickness of 0.9 mm. To ensure that the test is conducted in the linear viscoelastic region, the strain during the dynamic frequency sweep test is 2%, the test temperature is $T_{m2}$+20° C., and the frequency sweep range of the test is: 500 rad/s≤$w^2$≤0.05 rad/s, so as to obtain data in the lowest possible frequency region.

The dynamic frequency sweep test can characterize the degree of entanglement of molecular chains under solid phase melting (melt state). Compared with linear structures or short branched structures, long branched structures, network structures and low cross-linked structures have a high degree of entanglement and will show behavior deviating from the linear terminal. Ether polymers show solid phase behavior. When the ether polymer of the present application meets the above range, the entanglement state of the molecular chains can be further reduced, which is conductive to the diffusion of solvent molecules in the electrolyte solution between the molecular chains; and the ether polymer still maintains certain molecular chain entanglement state, and can form a gel-like substance with the electrolyte solution, thereby improving the cycling performance and storage performance of the battery cell.

In some embodiments, $1<K_1\leq100$; and optionally, $1<K_1\leq10$. Exemplarily, $K_1$ may be 0.8, 0.9, 1, 2, 5, 10, 15, 20, 30, 50, 100, 200, 500, 1000, 5000, 10000, or a range consisting of any two of the above numerical values.

In some embodiments, the glass transition temperature of the second ether polymer is $T_{g2}$, in ° C., $-100\leq T_{g2}\leq50$; optionally, $-80\leq T_{g2}\leq30$. Exemplarily, the glass transition temperature of the ether polymer may be −100° C., −80° C., −60° C., −30° C., 0° C., 30° C., 50° C., or a range consisting of any two of the above numerical values.

In some embodiments, the structural unit of the second ether polymer is the same as the structural unit of the first ether polymer described above, but the substituents of the side chains of the two are not completely the same.

In some embodiments, the second ether polymer comprises a structural unit represented by formula (BI), Formula (BI)

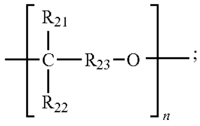

;

in formula (BI), $R_{21}$ and $R_{22}$ each independently include a hydrogen atom, substituted or unsubstituted C1-C3 alkyl, or substituted or unsubstituted C1-C3 alkoxy; and $R_{23}$ includes substituted or unsubstituted C1-C5 methylene.

In some embodiments, $R_{21}$ and $R_{22}$ each independently includes a hydrogen atom, and substituted or unsubstituted C1-C2 alkyl.

In some embodiments, $R_{23}$ includes a single bond, substituted or unsubstituted C1-C4 methylene.

In some embodiments, when substituted, the substituent may include one or more of cyano (—CN), nitro, sulfo, sulfonyl, amido, carboxyl, an ester group, a halogen atom.

Exemplarily, the second ether polymer comprises at least one of the structural units represented by formula (BI-1) to the structural units represented by formula (BI-8), Formula (BI-1)

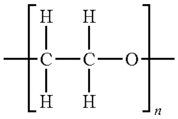

,

-continued

Formula (BI-2)

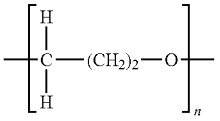

,

Formula (BI-3)

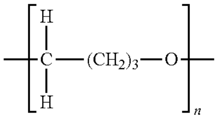

,

Formula (BI-4)

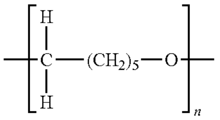

,

Formula (BI-5)

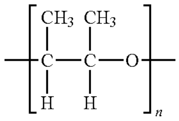

,

Formula (BI-6)

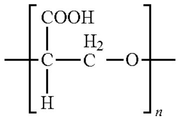

,

Formula (BI-7)

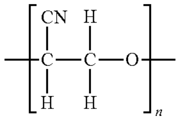

,

Formula (BI-8)

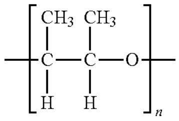

.

In some embodiments, the second ether polymer comprises a structural unit represented by formula (BII), Formula (BII)

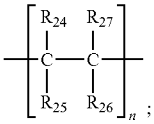

;

in formula (BII), $R_{24}$ to $R_{27}$ each independently include a hydrogen atom, substituted or unsubstituted C1-C3 alkyl, substituted or unsubstituted C1-C3 alkoxy, or an ether group, and at least one of $R_{24}$ to $R_{27}$ includes substituted or unsubstituted C1-C3 alkoxy or an ether group.

Optionally, $R_{24}$ to $R_{27}$ each independently include a hydrogen atom, substituted or unsubstituted C1-C2 alkyl, substituted or unsubstituted C1-C2 alkoxy, or an ether group, and at least one of $R_{24}$ to $R_{27}$ includes substituted or unsubstituted C1-C2 alkoxy or an ether group.

In some embodiments, the second ether polymer comprises at least one of the structural units represented by formula (BII-1) to the structural units represented by formula (BII-7), Formula (BII-1)

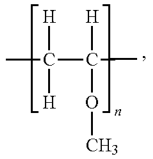

Formula (BII-2)

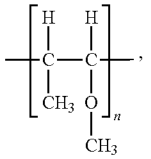

Formula (BII-3)

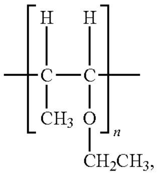

Formula (BII-4)

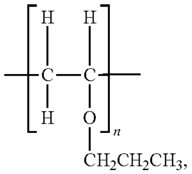

Formula (BII-5)

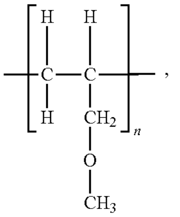

formula (BII-6)

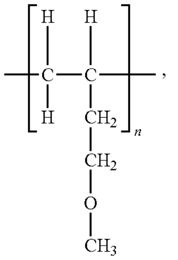

(BII-7)

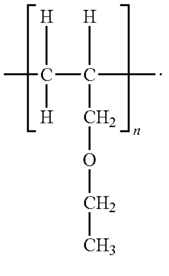

The above polymers are only examples of structural groups of main molecular chains. In the embodiments of the present application, the polymer can also be obtained by copolymerizing the above-mentioned structural groups with other types of structural groups (such as olefin structural units, acrylonitrile structural units).

When the above groups are substituted, the substituent may include one or more of cyano (—CN), nitro, sulfo, sulfonyl, amido, carboxyl, an ester group, a halogen atom. The above substituents are high pressure resistant substituents and are more conducive to stabilizing the structure of the polymer. The halogen atom may include a fluorine atom, a chlorine atom, a bromine atom, and the like.

In some embodiments, the degree of polymerization n of the second ether polymer is selected from a positive integer ranging from 1500 to 25000.

Optionally, the polymerization degree n of the second ether polymer is selected from a positive integer ranging from 3000 to 18000.

In some embodiments, the molecular weight of the second ether polymer is $1.2\times10^5$ g/mol to $1.0\times10^6$ g/mol.

Exemplarily, the molecular weight of the polymer can be $1.2\times10^5$ g/mol, $2\times10^5$ g/mol, $5\times10^5$ g/mol, $8\times10^5$ g/mol, $1\times10^6$ g/mol, or a range consisting of any two of the above numerical values.

[Second Ester Polymer]

In some embodiments, the liquid-retaining polymer includes a second ester polymer, wherein the second ester polymer is made into a sheet structure; the sheet structure is subjected to the dynamic frequency sweep test at ($T_{m3}$+20° C.) to obtain an elastic modulus G'-energy loss modulus G" curve, the slope of the elastic modulus G'-energy loss modulus G" curve is $K_2$, $1<K_2<\infty$, and $T_{m3}$° C. represents the melting temperature of the second ester polymer.

When the second ester polymer of the present application meets the above range, the entanglement state of the molecular chains can be further reduced, which is conductive to the diffusion of solvent molecules in the electrolyte solution between the molecular chains; and the second ester polymer still maintains certain molecular chain entanglement state, and can form a gel-like substance with the electrolyte solution, thereby improving the cycling performance and storage performance of the battery cell.

In some embodiments, $1<K_2\leq100$; and optionally, $1<K_2\leq10$.

Exemplarily, $K_2$ may be 1.01, 1.1, 1.2, 1.5, 2, 5, 10, 15, 20, 30, 50, 100, 200, 500, 1000, 5000, 10000, or a range consisting of any two of the above numerical values.

In some embodiments, the glass transition temperature of the second ester polymer is $T_{g3}$, in ° C., $-100\leq T_{g3}\leq50$; optionally, $-80\leq T_{g3}<30$.

Exemplarily, the glass transition temperature of the second ester polymer may be −100° C., −90° C., −80° C., −60° C., −30° C., 0° C., 30° C., 50° C., or a range consisting of any two of the above numerical values.

In some embodiments, the structural unit of the second ester polymer is the same as the structural unit of the first ester polymer described above, but the substituents of the side chains of the two are not completely the same.

In some embodiments, the second ester polymer includes a structural unit represented by formula (CI), Formula (CI)

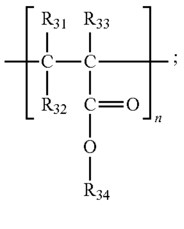

in formula (CI), $R_{31}$, $R_{32}$ and $R_{33}$ each independently include a hydrogen atom or substituted or unsubstituted C1-C8 alkyl; $R_{34}$ includes substituted or unsubstituted C1-C8 alkyl or substituted or unsubstituted C1-C8 hydroxyalkyl.

In some embodiments, $R_{34}$ includes substituted or unsubstituted C1-C6 alkyl, or substituted or unsubstituted C1-C6 hydroxyalkyl.

In some embodiments, $R_{31}$ includes a hydrogen atom, or substituted or unsubstituted methyl.

In some embodiments, $R_{32}$ and $R_{33}$ each independently include a hydrogen atom.

In some embodiments, $R_{34}$ includes substituted or unsubstituted C1-C4 alkyl, or substituted or unsubstituted C1-C4 hydroxyalkyl.

In some embodiments, when substituted, the substituent may include one or more of cyano (—CN), nitro, sulfo, sulfonyl, amido, carboxyl, an ester group, a halogen atom.

Exemplarily, the second ester polymer comprises at least one of the structural units represented by formula (CI-1) to the structural units represented by formula (CI-15), Formula (CI-1)

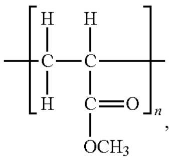

Formula (CI-2)

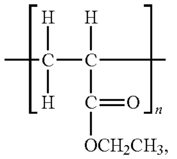

Formula (CI-3)

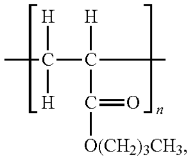

Formula (CI-4)

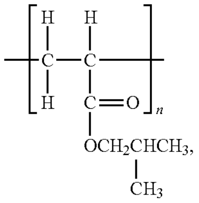

Formula (CI-5)

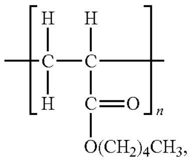

Formula (CI-6)

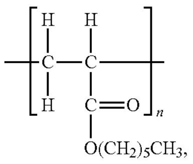

-continued

Formula (CI-7)

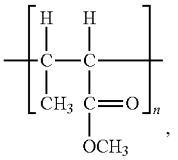

Formula (CI-8)

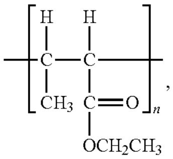

Formula (CI-9)

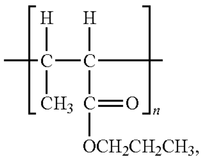

Formula (CI-10)

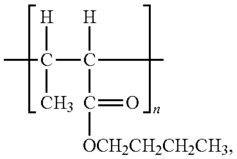

Formula (CI-11)

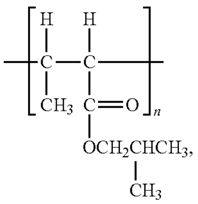

Formula (CI-12)

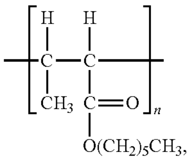

Formula (CI-13)

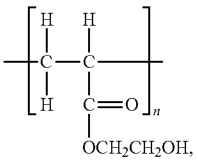

Formula (CI-14)

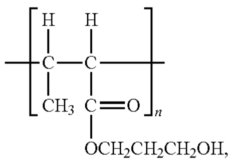

Formula (CI-15)

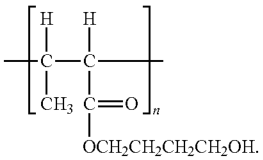

In some embodiments, the second ester polymer includes a structural unit represented by formula (CII), Formula (CII)

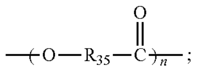

in the formula (CII), $R_{35}$ includes substituted or unsubstituted C2-C6 methylene.

In some embodiments, each $R_{35}$ independently includes C2-C4 methylene.

Exemplarily, the second ester polymer comprises at least one of the structural units represented by formula (CII-1) to the structural units represented by formula (CII-5), Formula (CII-1)

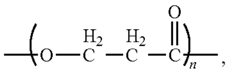

Formula (CII-2)

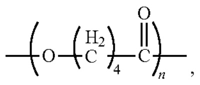

Formula (CII-3)

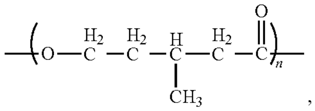

Formula (CII-4)

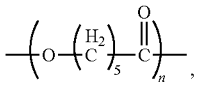

(CII-5)

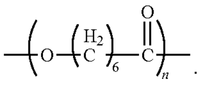

In some embodiments, the second ester polymer includes a compound represented by formula (CIII), Formula (CIII)

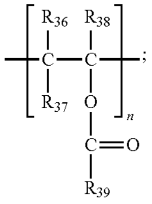

in formula (CIII), $R_{36}$, $R_{37}$ and $R_{38}$ each independently include a hydrogen atom, or substituted or unsubstituted C1-C8 alkyl; $R_{39}$ includes substituted or unsubstituted C1-C8 alkyl;

optionally, $R_{36}$, $R_{37}$ and $R_{38}$ each independently include a hydrogen atom, substituted or unsubstituted C1-C4 alkyl.

Exemplarily, the ester polymer includes at least one of the compounds represented by formula (CIII-1) to the compounds represented by formula (CIII-5), Formula (CIII-1)

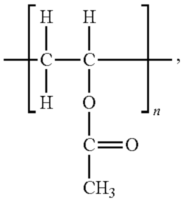

Formula (CIII-2)

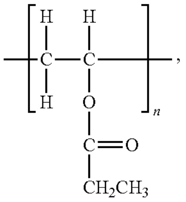

Formula (CIII-3)

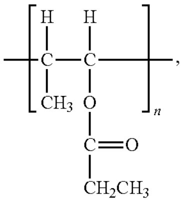

Formula (CIII-4)

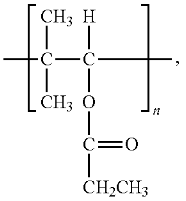

Formula (CIII-5)

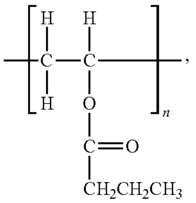

Formula (CIII-6)

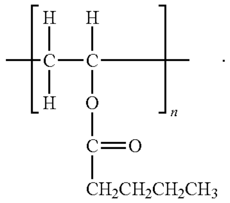

The above polymers are only examples of structural groups of main molecular chains. In the embodiments of the present application, the polymer can also be obtained by copolymerizing the above-mentioned structural groups with other types of structural groups (such as olefin structural units, acrylonitrile structural units, monomers with functional groups such as maleic anhydride).

When the above groups are substituted, the substituent may include one or more of cyano, nitro, sulfonyl, carboxyl, an ester group, a chlorine atom, a fluorine atom, and a bromine atom. The above substituents are high pressure resistant substituents and are more conducive to stabilizing the structure of the polymer.

In some embodiments, the degree of polymerization n of the second ester polymer is selected from a positive integer ranging from 800 to 20000.

In some embodiments, the degree of polymerization n of the second ester polymer is selected from a positive integer ranging from 1000 to 15000.

In some embodiments, the molecular weight of the second ester polymer is $1.2\times10^5$ g/mol to $1.0\times10^6$ g/mol.

Exemplarily, the molecular weight of the second ester polymer can be $1.2\times10^5$ g/mol, $2\times10^5$ g/mol, $5\times10^5$ g/mol, $8\times10^5$ g/mol, $1\times10^6$ g/mol, $1.5\times10^6$ g/mol, or a range consisting of any two of the above numerical values.

[Ketoaldehyde Polymers]

In some embodiments, the liquid-retaining polymer includes an aldehyde-ketone polymer, wherein the aldehyde-ketone polymer is made into a sheet structure; the sheet structure is subjected to the dynamic frequency sweep test at ($T_{m4}$+20° C.) to obtain an elastic modulus G'-energy loss modulus G" curve, the slope of the elastic modulus G'-energy loss modulus G" curve is $K_3$, $0.8\leq K_3<\infty$, and $T_{m4}$° C. represents the melting temperature of the aldehyde-ketone polymer.

In some embodiments, $0.8\leq K_3\leq 100$; and optionally, $0.8\leq K_3\leq 10$.

Exemplarily, $K_3$ may be 0.8, 0.9, 1, 2, 5, 10, 15, 20, 30, 50, 100, 200, 500, 1000, 5000, 10000, or a range consisting of any two of the above numerical values.

In some embodiments, the glass transition temperature of the aldehyde-ketone polymer is $T_{g4}$, in ° C., $-100\leq T_{g4}\leq 50$; optionally, $-80\leq T_{g4}\leq 30$.

Exemplarily, the glass transition temperature of the aldehyde-ketone polymer may be −100° C., −90° C., −80° C., −60° C., −30° C., 0° C., 30° C., 50° C., or a range consisting of any two of the above numerical values.

In some embodiments, the liquid-retaining polymer includes an aldehyde-ketone polymer, and the aldehyde-ketone polymer includes a structural unit represented by formula (DI), Formula (DI)

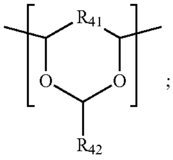 ;

in formula (DI), $R_{41}$ includes a single bond, substituted or unsubstituted C1-C6 methylene; and $R_{42}$ includes a hydrogen atom, substituted or unsubstituted C1-C6 alkyl.

Optionally, $R_{41}$ includes a single bond, substituted or unsubstituted C1-C2 methylene.

Optionally, $R_{42}$ includes a hydrogen atom, substituted or unsubstituted C1-C3 alkyl.

In the embodiments of the present application, a single bond indicates that no group exists, and the atoms on both sides of the group are connected by a single bond. For example, $R_{41}$ is a single bond, which indicates that the carbon atoms on both sides of $R_{41}$ are connected by a single bond.

In some embodiments, when substituted, the substituent may include one or more of cyano (—CN), nitro, sulfo, sulfonyl, amido, carboxyl, an ester group, a halogen atom.

Exemplarily, the aldehyde-ketone polymer comprises at least one of the structural units represented by formula (DI-1) to the structural units represented by formula (DI-6), Formula (DI-1)

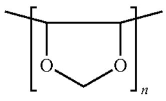 ,

Formula (DI-2)

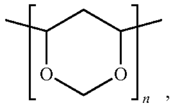 ,

Formula (DI-3)

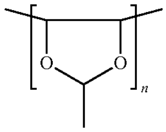 ,

Formula (DI-4)

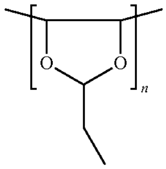 ,

Formula (DI-5)

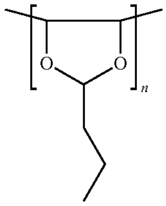 ,

Formula (DI-6)

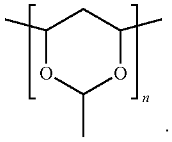 .

Exemplarily, the aldehyde-ketone polymer includes a structural unit represented by formula (DII), Formula (DII)

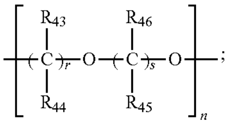 ;

in formula (DII), $R_{43}$ to $R_{46}$ each independently include a hydrogen atom, hydroxyl, substituted or unsubstituted C1-C3 alkyl, substituted or unsubstituted C1-C3 hydroxyalkyl, or substituted or unsubstituted C1-C3 alkoxy; r and s are each independently selected from integers in the range of 0 to 5, and at least one of r and s is selected from a positive integer.

Optionally, $R_{43}$ to $R_{46}$ each independently include a hydrogen atom, hydroxyl, substituted or unsubstituted C1-C3 alkyl, substituted or unsubstituted C1-C2 hydroxyalkyl, or substituted or unsubstituted C1-C2 alkoxy.

In some embodiments, the aldehyde-ketone polymer comprises at least one of the structural units represented by formula (DII-1) to the structural units represented by formula (DII-4), Formula (DII-1)

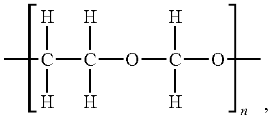

Formula (DII-2)

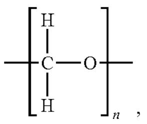

Formula (DII-3)

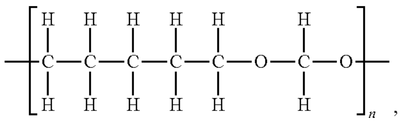

Formula (DII-4)

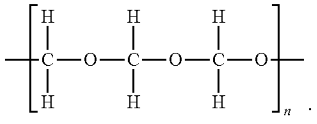

The above polymers are only examples of structural groups of main molecular chains. In the embodiments of the present application, the polymer can also be obtained by copolymerizing the above-mentioned structural groups with other types of structural groups (such as olefin structural units, enol structural units, acrylonitrile structural units).

When the above groups are substituted, the substituent may include one or more of cyano (—CN), nitro, sulfonyl, carboxyl, an ester group, a chlorine atom, a fluorine atom, and a bromine atom. The above substituents are high pressure resistant substituents and are more conducive to stabilizing the structure of the polymer.

In some embodiments, the degree of polymerization n of the aldehyde-ketone polymer is selected from a positive integer ranging from 500 to 15000.

Optionally, the polymerization degree n of the saldehyde-ketonepolymer is selected from a positive integer ranging from 500 to 10000.

In some embodiments, the molecular weight of the aldehyde-ketone polymer is $1.2\times10^5$ g/mol to $1.0\times10^6$ g/mol.

Exemplarily, the molecular weight of the aldehyde-ketone polymer can be $1.2\times10^5$ g/mol, $2\times10^5$ g/mol, $5\times10^5$ g/mol, $8\times10^5$ g/mol, $1\times10^6$ g/mol, $1.0\times10^6$ g/mol, or a range consisting of any two of the above numerical values.

The relevant parameters of the liquid-retaining polymer in the embodiments of the present application can be detected by the following methods:

The groups of the liquid-retaining polymer in the embodiments of the present application can be detected by infrared spectrophotometry IR. Specifically, the liquid-retaining polymer is tested by a Thermo Nicolet Nexus 670 attenuated total reflection Fourier transform infrared spectrometer (FTIR-ATR), and then tested with reference to the standard GB/T6040-2002. The test range is: ATR method 600 to 4000 $cm^{-1}$; repeatability: ±2 $cm^{-1}$; resolution: better than 4 $cm^{-1}$; transmission depth 0.2 to 0.6 μm.

The structure of the liquid-retaining polymer in the embodiments of the present application can be tested by nuclear magnetic resonance NMR. Specifically, 1H NMR and 13C NMR are performed on a Varian Mercury Plus-400 nuclear magnetic resonance spectrometer, the test temperature is 20° C., TMS is used as the internal standard, $CDCl_3$ is used as the solvent, and the proton resonance frequency is 400 MHZ.

The polymer monomer type of the liquid-retaining polymer in the embodiments of the present application (especially suitable for monomers that account for a relatively small proportion in the polymer) can be tested by pyrolysis-gas chromatography-mass spectrometry, and the specific test steps are as follows: 0.5 mg of the sample is accurately weighed and put into the sample cup. The sample cup is fixed to the injection rod, and then put into the pyrolyzer installed near the GC (gas chromatography) injection port. After the temperature of the pyrolyzer reaches the set temperature, the injection button is pressed, and the sample cup quickly falls into the core of the pyrolysis furnace by free fall. In the inert gas $N_2$ atmosphere, the volatile components are instantly vaporized and carried into the gas chromatography column by the carrier gas for separation. Finally, they are detected by a flame ionization detector FID or a mass spectrometer MS to obtain a gas chromatogram or a total ion flow diagram.

The molecular weight of the liquid-retaining polymer in the embodiments of the present application has a meaning well known in the art, can be measured using devices and methods commonly used in the art, and can be tested using gel permeation chromatography (GPC). The specific testing steps are as follows: an appropriate amount of the sample to be tested (the sample concentration is sufficient to ensure 8%-12% shading) is taken, 20 ml of deionized water is added, and simultaneously the mixture is subjected to ultraviolet ultrasonic treatment for 5 min (53 KHz/120 W) to ensure that the sample is completely dispersed, and then the sample is measured according to GB/T19077-2016/ISO 13320:2009 standard.

Optionally, a multi-angle laser light scattering instrument MALLS is used for testing, specifically, GPC combined with a Dawn Heleos II multi-angle laser light scattering device, an Optilab T-rEX refractive index (RI) detector and a Visco Star II viscometer (Wyatt Technology Corporation, USA) is used. The test is carried out at 30°, using tetrahydrofuran as the mobile phase at a flow rate of 1.0 ml/min, and the commercial software ASTRA6 is used to process the SEC-SAMLL data to obtain the molecular weight parameters.

The above polymers are only examples of structural groups of main molecular chains. In the embodiments of the present application, the polymer can also be obtained by copolymerizing the above-mentioned structural groups with a small amount of other types of structural groups (such as olefin structural units, ester monomers, nitrile monomers, amide monomers and other structural units).

[Positive Electrode Plate]

The battery cell comprises a positive electrode plate, the positive electrode plate comprises a positive electrode current collector and a positive electrode film layer provided on the positive electrode current collector.

In some embodiments, the positive electrode film layer comprises a positive electrode active material.

In some other embodiments, the positive electrode film layer comprises a positive electrode active material and a liquid-retaining polymer.

As some examples, the positive electrode film layer comprises a polymer layer containing a liquid-retaining polymer and a positive electrode active material layer containing positive electrode active material particles, the positive electrode active material layer is provided on at least one surface of the positive electrode current collector, and the polymer layer is provided on the surface of the positive electrode active material layer facing away from the positive electrode current collector.

As some other examples, there are a plurality of positive electrode active material particles, there is a pore between two adjacent positive electrode active material particles, and the liquid-retaining polymer is distributed in the pore.

As an example, the positive electrode current collector has two surfaces opposite in its own thickness direction, and the positive electrode active material layer is provided on either one or both of the two opposite surfaces of the positive electrode current collector.

The positive electrode active material layer comprises a positive electrode active material, and the positive electrode active material can be a positive electrode active material for a battery cell known in the art. As an example, the positive electrode active material is at least one of a lithium-containing positive electrode active material and a sodium-containing positive electrode active material, for example, may include at least one of the following materials: a lithium-containing phosphate compound, a lithium-containing transition metal oxide, a sodium-containing phosphate compound, and a sodium-containing transition metal oxide.

Exemplarily, the general formula of the olivine-type phosphate active material (containing lithium phosphate compound) is: $Li_xA_yMe_aM_bP_{1-c}X_cY_z$, wherein $0≤x≤1.3$, $0≤y≤1.3$, and $0.9≤x+y≤1.3$; $0.9≤a≤1.5$, $0≤b≤0.5$, and $0.9≤a+b≤1.5$; $0≤c≤0.5$; $3<z≤5$; A includes one or more of Na, K, and Mg; Me includes one or more of Mn, Fe, Co, and Ni; M includes one or more of B, Mg, Al, Si, P, S, Ca, Sc, Ti, V, Cr, Cu, Zn, Sr, Y, Zr, Nb, Mo, Cd, Sn, Sb, Te, Ba, Ta, W, Yb, La, and Ce; X includes one or more of S, Si, Cl, B, C, and N; and Y includes one or more of O and F. Specifically, the olivine-type phosphate active material includes one or more of $LifePO_4$, $LiMnPO_4$, $LiNiPO_4$, and $LiCoPO_4$.

Exemplarily, lithium transition metal oxides (layered materials such as ternary, lithium/sodium nickel oxide, lithium/sodium cobalt oxide, lithium/sodium manganate, lithium-rich layered and rock salt phase layered materials). The general formula of the layered structure positive electrode active material is: $Li_xA_yNi_aCo_bMn_cM_{(1-a-b-c)}Y_z$, wherein $0≤x≤2.1$, $0≤y≤2.1$, and $0.9≤x+y≤2.1$; $0≤a≤1$, $0≤b≤1$, $0≤c≤1$, and $0.1≤a+b+c≤1$; $1.8≤z≤3.5$; A includes one or more of Na, K, and Mg; M includes one or more of B, Mg, Al, Si, P, S, Ca, Sc, Ti, V, Cr, Fe, Cu, Zn, Sr, Y, Zr, Nb, Mo, Cd, Sn, Sb, Te, Ba, Ta, W, Yb, La, and Ce; Y includes one or more of O and F. Optionally, y=0. Specifically, the layered structure positive electrode active material may include one or more of lithium cobalt oxide LCO, lithium nickel oxide LNO, lithium manganese oxide LMO, $LiNi_{1/3}Co_{1/3}Mn_{1/3}O_2$ (NML33), $LiNi_{0.5}Co_{0.2}Mn_{0.3}O_2$ (NCM523), $LiNi_{0.6}Co_{0.2}Mn_{0.2}O_2$ (NCM622), $LiNi_{0.8}Co_{0.1}Mn_{0.1}O_2$ (NCM811) and NCA.

In some embodiments, the positive electrode current collector can be a metal foil or a composite current collector. As an example of the metal foil, an aluminum foil or an aluminum alloy foil can be used. The composite current collector may comprise a high molecular material substrate layer and a metal layer formed on at least one surface of the high molecular material substrate layer. As an example, the metal material may be selected from one or more of aluminum, aluminum alloy, nickel, nickel alloy, titanium, titanium alloy, silver and silver alloy, and the high molecular material substrate layer may be selected form one or more of polypropylene (PP), polyethylene terephthalate (PET), polybutylene terephthalate (PBT), polystyrene (PS) and polyethylene (PE).

In some embodiments, the positive electrode active material layer further optionally comprises a positive electrode conductive agent. In the embodiments of the present application, the type of the positive electrode conductive agent is not specifically limited, as an example, the positive electrode conductive agent is selected from one or more of superconducting carbon, conductive carbon black, conductive graphite, acetylene black, carbon black, Ketjen black, carbon dots, carbon nanotubes, graphene, and carbon nanofibers. In some embodiments, based on the total mass of the positive electrode active material layer, the mass percentage of the positive electrode conductive agent is below 5%.

In some embodiments, the positive electrode active material layer further optionally comprises a positive electrode binder. In the embodiments of the present application, the type of the positive electrode binder is not specifically limited. As an example, the positive electrode binder may be selected from one or more of polyvinylidene fluoride (PVDF), polytetrafluoroethylene (PTFE), a vinylidene fluoride-tetrafluoroethylene-propylene terpolymer, a vinylidene fluoride-hexafluoropropylene-tetrafluoroethylene terpolymer, a tetrafluoroethylene-hexafluoropropylene copolymer, and a fluorinated acrylate resin. In some embodiments, based on the total mass of the positive electrode active material layer, the mass percentage of the positive electrode binder is below 5%. Compared with the crystallinity of the fluoropolymer in the embodiments of the present application, the crystallinity of the positive electrode binder is higher.

The positive electrode active material layer is usually formed by coating a positive electrode slurry on the positive electrode current collector, followed by drying and cold pressing. The positive electrode slurry is generally formed by dispersing the positive electrode active material, the optional liquid-retaining polymer, the optional conductive agent, the optional binder, and any other components in a solvent and uniformly stirring the mixture. The solvent may be N-methyl pyrrolidone (NMP), but is not limited thereto. Of course, the preparation of the positive electrode plate is not limited to the above method, and the preparation method described earlier herein can also be used.

[Negative Electrode Plate]

The battery cell further comprises a negative electrode plate.

In some embodiments, the negative electrode plate comprises a negative electrode current collector and a negative electrode film layer provided on at least one surface of the negative electrode current collector. For example, the negative electrode current collector has two opposite surfaces in the direction of its own thickness, and the negative electrode film layer is provided on either or both of the two opposite surfaces of the negative electrode current collector.

In some embodiments, the positive electrode film layer comprises a negative electrode active material.

As some examples, the negative electrode film layer comprises a polymer layer containing a liquid-retaining polymer and a negative electrode active material layer containing negative electrode active material particles, the negative electrode active material layer is provided on at least one surface of the negative electrode current collector, and the polymer layer is provided on the surface of the negative electrode active material layer facing away from the negative electrode current collector.

As some other examples, there are a plurality of negative electrode active material particles, there is a pore between two adjacent negative electrode active material particles, and the liquid-retaining polymer is distributed in the pore.

A negative electrode active material well-known in the art for a battery cell may be used as the negative electrode active material. As an example, the negative electrode active material may include, but not limited to, at least one of natural graphite, artificial graphite, soft carbon, hard carbon, a silicon-based material, a tin-based material, and lithium titanate. The silicon-based material may include at least one of elemental silicon, a silicon oxide, a silicon-carbon composite, a silicon-nitrogen composite, and a silicon alloy. The tin-based material may include at least one of elemental tin, a tin oxide, and a tin alloy In some embodiments, the negative electrode active material layer further optionally comprises a negative electrode conductive agent. In the embodiments of the present application, the type of the negative electrode conductive agent is not specifically limited, as an example, the negative electrode conductive agent may include at least one of superconducting carbon, conductive graphite, acetylene black, carbon black, Ketjen black, carbon dots, carbon nanotubes, graphene, and carbon nanofibers. In some embodiments, based on the total mass of the negative electrode active material layer, the mass percentage of the negative electrode conductive agent is ≤5%.

In some embodiments, the negative electrode active material layer further optionally comprises a negative electrode binder. In the embodiments of the present application, the type of the negative electrode binder is not specifically limited, as an example, the negative electrode binder may include at least one of styrene butadiene rubber (SBR), water-soluble unsaturated resin SR-1B, water-based acrylic resin (such as polyacrylic acid (PAA), polymethacrylic acid (PMAA), and polyacrylic acid sodium (PAAS)), polyacrylamide (PAM), polyvinyl alcohol (PVA), sodium alginate (SA), and carboxymethyl chitosan (CMCS). In some embodiments, based on the total mass of the negative electrode active material layer, the mass percentage of the negative electrode binder is ≤5%.

In some embodiments, the negative electrode active material layer further optionally comprises other auxiliaries. As an example, the other auxiliaries may include thickeners, such as, carboxymethyl cellulose sodium (CMC), a PTC thermistor material, and the like. In some embodiments, based on the total mass of the negative electrode active material layer, the mass percentage of the other auxiliaries is ≤2%.

In some embodiments, the negative electrode current collector may be a metal foil or a composite current collector. As an example of the metal foil, a copper foil can be used. The composite current collector may comprise a high molecular material substrate layer and a metal material layer formed on at least one surface of the high molecular material substrate layer. As an example, the metal material may include at least one of copper, a copper alloy, nickel, a nickel alloy, titanium, a titanium alloy, silver, and a silver alloy. As an example, the high molecular material substrate layer may include at least one of polypropylene (PP), polyethylene terephthalate (PET), polybutylene terephthalate (PBT), polystyrene (PS), and polyethylene (PE).

The negative electrode active material layer is usually formed by coating a negative electrode slurry on the negative electrode current collector, followed by drying and cold pressing. The negative electrode slurry is generally formed by dispersing the negative electrode active material, the optional liquid-retaining polymer, the optional conductive agent, the optional binder, and the other optional auxiliaries in a solvent and uniformly stirring the mixture. The solvent may be N-methyl pyrrolidone (NMP) or deionized water, but not limited thereto. Of course, the preparation of the negative electrode plate is not limited to the above method, and the preparation method described earlier herein can also be used.

The negative electrode plate does not exclude other additional functional layers other than the negative electrode active material layer. For example, in some embodiments, the negative electrode plate in the present application further comprises a conductive primer coating (e.g. composed of a conductive agent and a binder) sandwiched between the negative electrode current collector and the negative electrode active material layer and provided on the surface of the negative electrode current collector. In some other embodiments, the negative electrode plate of the present application further comprises a protective layer covering the surface of the negative electrode active material layer.

[Electrolyte Solution]

The battery cell comprises an electrolyte solution.

During the charging and discharging process of the battery cell, active ions are intercalated and deintercalated back and forth between the positive electrode plate and the negative electrode plate, and the electrolyte solution serves to conduct the active ions between the positive electrode plate and the negative electrode plate. The present application has no specific limitation on the type of the electrolyte solution, which can be selected according to actual requirements.

The electrolyte solution comprises an electrolyte salt and a solvent. The types of the electrolyte salt and the solvent are not specifically limited, and may be selected according to actual requirements.

When the battery cell of the present application is a lithium-ion battery, as an example, the electrolyte salt may include, but is not limited to, at least one of lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bis(fluorosulfonyl)imide (LiFSI), lithium bis(trifluoromethanesulfonyl)imide (LiTFSI), lithium trifluoromethanesulfonate (LiTFS), lithium difluoro (oxalato) borate (LiDFOB), lithium bis(oxalate) borate (LiBOB), lithium difluorophosphate ($LiPO_2F_2$), lithium difluoro bis(oxalato)phosphate (LiDFOP), and lithium tetrafluoro(oxalato)phosphate (LiTFOP).

When the battery cell in the present application is a sodium-ion battery, as an example, the electrolyte salt may include, but is not limited to, at least one of sodium hexafluorophosphate ($NaPF_6$), sodium tetrafluoroborate ($NaBF_4$), sodium perchlorate ($NaClO_4$), sodium hexafluoroarsenate ($NaAsF_6$), sodium bis(fluorosulfonyl)imide (NaFSI), sodium bis(trifluoromethanesulfonyl)imide (NaTFSI), sodium trifluoromethanesulfonate (NaTFS), sodium difluoro (oxalato) borate (NaDFOB), sodium bis (oxalate) borate (NaBOB), sodium difluorophosphate ($NaPO_2F_2$), sodium difluoro bis(oxalato)phosphate (NaDFOP), and sodium tetrafluoro (oxalato)phosphate (NaTFOP).

As an example, the solvent may include, but is not limited to, at least one of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methylsulfonylmethane (MSM), ethyl methyl sulfone (EMS) and ethylsulfonylethane (ESE).

In some embodiments, the electrolyte solution further optionally comprises an additive. For example, the additive may include a negative electrode film-forming additive, or may include a positive electrode film-forming additive, and may further include an additive capable of improving certain properties of a battery, such as an additive for improving the overcharging performance of the battery, an additive for improving the high temperature performance of the battery, an additive for improving the low temperature performance of the battery.

In some embodiments, the positive electrode plate, the separator and the negative electrode plate may be made into an electrode assembly by a winding process and/or a stacking process.

In some embodiments, the battery cell may comprise an outer package. The outer package can be used to encapsulate the above-mentioned electrode assembly and electrolyte solution.

In some embodiments, the outer package of the battery cell can be a hard shell, such as a hard plastic shell, an aluminum shell, and a steel shell. The outer package of the battery cell may also be a soft pouch, such as a bag-type soft pouch. The material of the soft package can be plastic, such as at least one of polypropylene (PP), polybutylene terephthalate (PBT), and polybutylene succinate (PBS).

In some embodiments, the positive electrode plate, the separator, and the negative electrode plate may be made into an electrode assembly by a winding process or a stacking process.

The shape of the battery cell is not particularly limited in the present application, and may be a cylinder shape, a square shape, or any other shape. For example, FIG. 9 shows a battery cell 5 in a square structure as an example.

Figure 10:
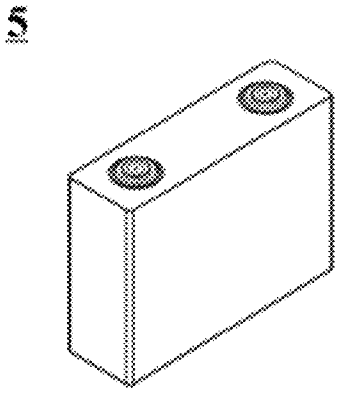
FIG. 10 is a schematic diagram of an embodiment of a battery cell of the present application.
Figure 11:
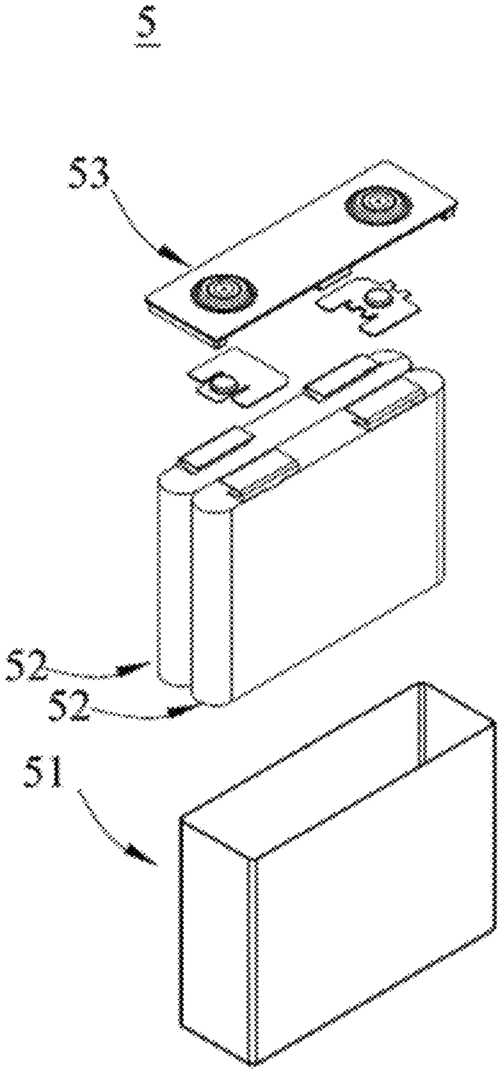
FIG. 11 is a schematic exploded view of the embodiment of the battery cell in FIG. 10.

In some embodiments, as shown in FIGS. 10 and 11, the outer package may include a case 51 and a cover plate 53. The case 51 may include a bottom plate and a side plate connected to the bottom plate, which enclose to form an accommodating cavity. The case 51 has an opening in communication with the accommodating cavity, and the cover plate 53 is configured to cover the opening to close the accommodating cavity. The positive electrode plate, the negative electrode plate, and the separator may be formed into an electrode assembly 52 by a winding process or a stacking process. The electrode assembly 52 is encapsulated in the accommodating cavity. The electrode assembly 52 is impregnated with the electrolyte solution. The number of the electrode assembly 52 included in the battery cell 5 can be one or more, and can be adjusted according to requirements.

The preparation method for the battery cell of the present application is well known. In some embodiments, the positive electrode plate, the separator, the negative electrode plate, and the electrolyte solution may be assembled to form the battery cell. As an example, the positive electrode plate, the separator, and the negative electrode plate may form the electrode assembly by a winding process or a stacking process; the electrode assembly is placed in the outer package; the electrolyte solution is poured in after drying; and the battery cell is obtained through processes such as vacuum encapsulation, standing, formation, and shaping.

In some embodiments of the present application, the battery cell according to the present application can be assembled into a battery module, the number of battery cells included in the battery module can be multiple, and the specific number can be adjusted according to the application and capacity of the battery module.

Figure 12:
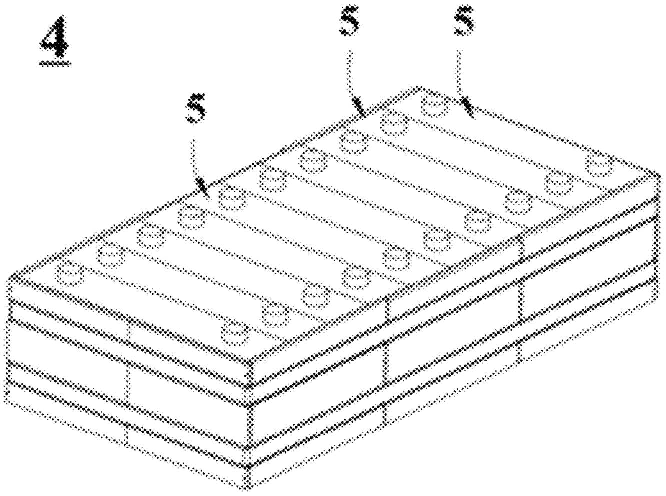
FIG. 12 is a schematic diagram of an embodiment of a battery module according to the present application.

FIG. 12 is a schematic diagram of a battery module 4 as an example. As shown in FIG. 12, in the battery module 4, a plurality of battery cells 5 can be sequentially arranged in the length direction of the battery module 4. Alternatively, of course, they may be provided in any other manner. The plurality of battery cells 5 may further be fixed by fasteners.

Optionally, the battery module 4 may further include a shell having an accommodating space, and the plurality of battery cells 5 are accommodated in the accommodating space.

In some embodiments, the aforementioned battery modules can further be assembled into a battery pack, and the number of battery modules included in the battery pack can be adjusted according to the application and capacity of the battery pack.

Both the battery module 4 and the battery pack can be used as specific examples of batteries in the embodiments of the present application.

Figure 13:
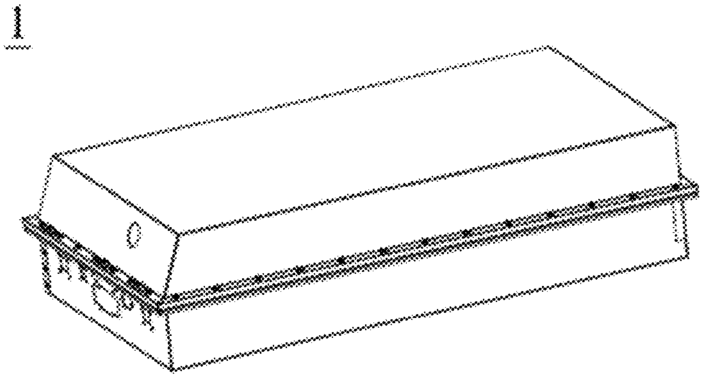
FIG. 13 is a schematic diagram of an embodiment of a battery pack according to the present application.
Figure 14:
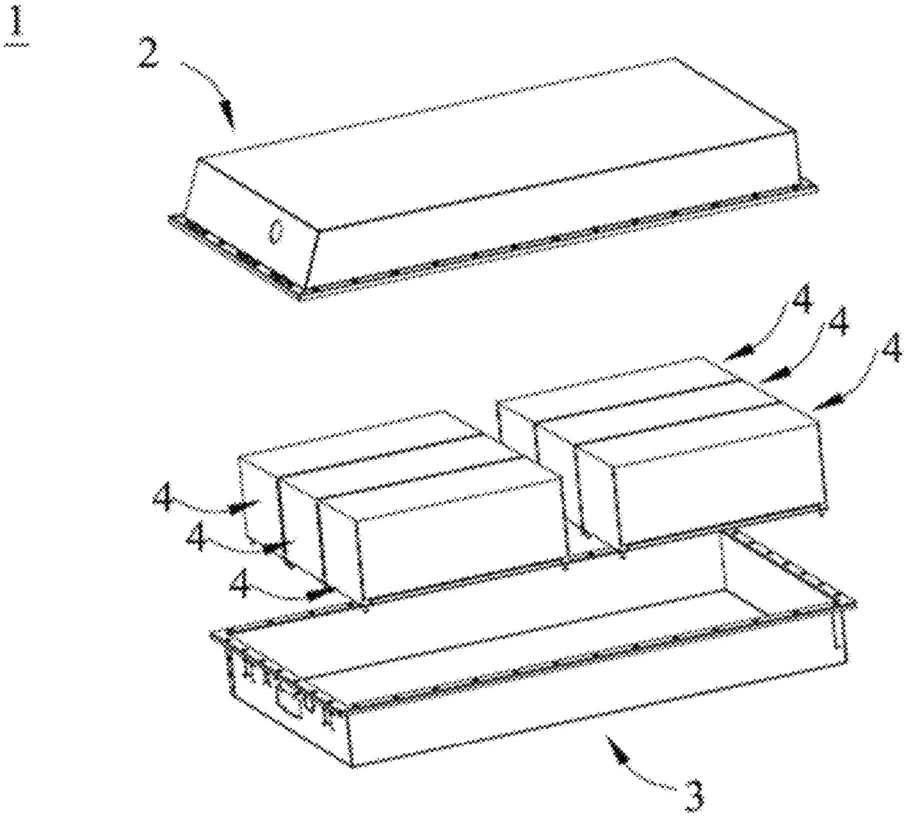
FIG. 14 is a schematic exploded view of the embodiment of the battery pack as shown in FIG. 13.

FIG. 13 and FIG. 14 are schematic diagrams of a battery pack 1 as an example. As shown in FIG. 13 and FIG. 14, the battery pack 1 may include a battery box and a plurality of battery modules 4 provided in the battery box. The battery box includes an upper box 2 and a lower box 3, and the upper box 2 is configured to cover the lower box 3 to form an enclosed space for accommodating the battery modules 4. The plurality of battery modules 4 may be arranged in the battery box in any manner.

Electrical Apparatus

In a third aspect, the present application provides an electrical apparatus, and the electrical apparatus includes at least one of the battery cell, the battery module, and the battery pack of the present application. The battery cell, the battery module and the battery pack may be used as a power source of the electrical apparatus, or may be used as an energy storage unit of the electrical apparatus. The electrical apparatus may be, but is not limited to, a mobile device (such as a mobile phone and a laptop), an electric vehicle (such as an all-electric vehicle, a hybrid electric vehicle, a plug-in hybrid electric vehicle, an electric bicycle, an electric scooter, an electric golf cart, and an electric truck), an electric train, a ship, a satellite, an energy storage system, etc. In some embodiments, the battery cell comprises a liquid injection hole, which is used to inject the electrolyte solution; when the battery cell is applied to an electrical apparatus, the liquid injection hole is located at the bottom of the battery cell in the vertical direction. Since the amount of free electrolyte solution in the battery cell is very small or even no free electrolyte solution exists, when the liquid injection hole is arranged at the bottom of the battery cell in the vertical direction, the operational reliability of the battery cell can be improved, thereby improving the operational reliability of the electrical apparatus.

Figure 15:
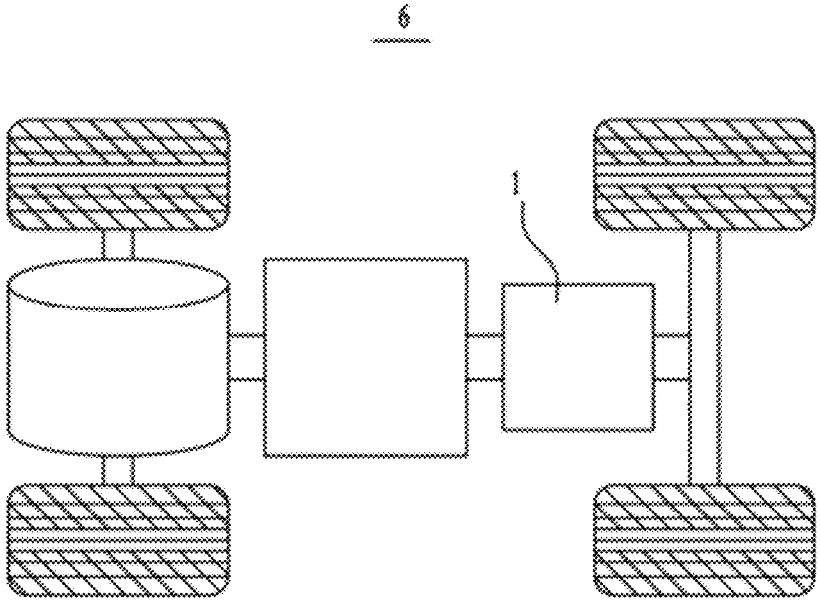
FIG. 15 is a schematic diagram of an embodiment of an electrical apparatus comprising the battery cell of the present application as the power source.

For the electrical apparatus, the battery cell, the battery module or the battery pack can be selected according to use requirements thereof. FIG. 15 is a schematic diagram of an electrical apparatus as an example. This electrical apparatus 6 is an all-electric vehicle, a hybrid electric vehicle, or a plug-in hybrid electric vehicle, etc. In order to meet the requirements of the electrical apparatus for high power and high energy density, a battery pack 1 or a battery module may be used. As another example, the electrical apparatus may be a mobile phone, a tablet personal computer, a laptop, etc. The electrical apparatus is generally required to be thin and light, and may use a battery cell as a power source.

EXAMPLES

Examples of the present application will be described below. The examples described below are exemplary and only used to explain the present application, and are not to be construed as limiting the present application. Where specific techniques or conditions are not specified in the examples, the techniques or conditions described in the literature of the art or the product specifications are followed. Where no manufacturers are specified, the employed reagents or instruments are all commercially available conventional products.

Example 1 Preparation of Lithium-Ion Battery (1) Preparation of Positive Electrode Plate A positive electrode active material $LiNi_{0.6}Co_{0.2}Mn_{0.2}O_2$ (NCM622), a conductive agent carbon black, a binder polyvinylidene fluoride (PVDF) were added into N-methyl pyrrolidone (NMP) and mixed to give a positive electrode slurry. The mass ratio of $LiNi_{0.6}Co_{0.2}Mn_{0.2}O_2$ (NCM622), conductive carbon black and PVDF in the positive electrode slurry is 97.5:2:0.5. The positive electrode slurry was coated on the current collector aluminum foil, oven dried at 85° C., then cold pressed, then subjected to edge cutting, slicing, and striping, and then oven dried at 85° C. under vacuum for 4 h, to provide the positive electrode plate.

(2) Preparation of Negative Electrode Plate

A negative electrode active material artificial graphite, a conductive agent carbon black, a binder styrene butadiene rubber (SBR), and a thickener sodium hydroxymethylcellulose (CMC) in a weight ratio of 94.9:5.5:0.5:0.1 were dissolved in deionized water, and uniformly mixed to prepare a negative electrode slurry. The negative electrode slurry was coated on the current collector copper foil, oven dried at 85° C., cold-pressed, trimmed, cut, and slit, and then dried under vacuum at 120° C. for 12 h to obtain the negative electrode plate.

(3) Preparation of Electrolyte Solution

In an environment with a water content of less than 10 ppm, non-aqueous organic solvents ethylene carbonate (EC) and ethyl methyl carbonate (EMC) are mixed in a volume ratio of 3:7 to obtain a solvent of an electrolyte solution, and then lithium salt lithium $LiPF_6$ and the mixed solvent are mixed to prepare an electrolyte solution with a lithium salt concentration of 1 mol/L.

(4) Preparation of Separator

A 16 μm polyethylene film (PE) was used as a substrate film of the separator, and a coating was uniformly dotted on the surface of the substrate film, wherein the coating comprises a swellable polymer.

(5) Preparation of Lithium-Ion Battery

The positive electrode plate, the separator, and the negative electrode plate mentioned above were stacked in order, so that the separator was positioned between the positive electrode plate and the negative electrode plate to play a separating role, and then winding was performed so that an electrode assembly was obtained; the electrode assembly was put into an outer package shell, and after drying, the electrolyte solution was injected thereto; and the lithium-ion battery was obtained through processes such as vacuum encapsulation, standing, formation, and shaping.

Example 2

A lithium-ion battery was prepared by a method similar to that of Example 1. The difference from Example 1 is that the positive electrode plate of Example 2 is prepared as follows:

A liquid-retaining polymer, a positive electrode active material $LiNi_{0.6}Co_{0.2}Mn_{0.2}O_2$ (NCM622), a conductive agent carbon black, a binder polyvinylidene fluoride (PVDF) were added into N-methyl pyrrolidone (NMP) and mixed to give a positive electrode slurry. The mass ratio of the liquid-retaining polymer, $LiNi_{0.6}Co_{0.2}Mn_{0.2}O_2$ (NCM622), conductive carbon black and PVDF in the positive electrode slurry is 0.2:97.3:2:0.5. The positive electrode slurry was coated on the current collector aluminum foil, oven dried at 85° C., then cold pressed, then subjected to edge cutting, slicing, and striping, and then oven dried at 85° C. under vacuum for 4 h, to provide the positive electrode plate.

The negative electrode plate is prepared as follows:

A liquid-retaining polymer, a negative electrode active material artificial graphite, a conductive agent carbon black, a binder styrene butadiene rubber (SBR), and a thickener sodium hydroxymethylcellulose (CMC) in a weight ratio of 2.5:94.9:2:0.5:0.1 were added into deionized water, and uniformly mixed to prepare a negative electrode slurry. The negative electrode slurry was coated on the current collector copper foil, oven dried at 85° C., cold-pressed, trimmed, cut, and slit, and then dried under vacuum at 120° C. for 12 h to obtain the negative electrode plate.

Example 3

A lithium-ion battery was prepared by a method similar to that of Example 1. The difference from Example 1 is that the monomers of Example 3 and Example 1 are different. Specifically, the monomers in Example 3 additionally include acrylamide, and the molar percentage of acrylamide is 1%.

Example 4

A lithium-ion battery was prepared by a method similar to that of Example 1. The difference from Example 1 is that the negative electrode plate of Example 4 is prepared as follows:

A liquid-retaining polymer, a negative electrode active material artificial graphite, a conductive agent carbon black, a binder styrene butadiene rubber (SBR), and a thickener sodium hydroxymethylcellulose (CMC) in a weight ratio of 2.5:94.9:2:0.5:0.1 were added into deionized water, and uniformly mixed to prepare a negative electrode slurry. The negative electrode slurry was coated on the current collector copper foil, oven dried at 85° C., cold-pressed, trimmed, cut, and slit, and then dried under vacuum at 120° C. for 12 h to obtain the negative electrode plate.

Example 5

A lithium-ion battery was prepared by a method similar to that of Example 1. The difference from Example 1 is that the separator of Example 5 is prepared as follows:

A 16 μm polyethylene film (PE) was used as a substrate film of the separator, and a plurality of coating layers of a strip structure were applied at intervals uniformly on the surface of the substrate film, wherein the coating comprises a swellable polymer.

Example 6

A lithium-ion battery was prepared by a method similar to that of Example 1. The difference from Example 1 is that the separator of Example 5 is prepared as follows:

Vinylidene fluoride VDF and perfluoropropylene HFP was used as main materials, the molar ratio of VDF to HFP was 90%:10%, and a bubble-shaped separator was prepared by the phase inversion method.

Example 7

A lithium-ion battery was prepared by a method similar to that of Example 1. The difference from Example 1 is that in Example 7, a groove (second recessed area) is provided on the surface of the positive electrode plate. The preparation method of the positive electrode plate is as follows:

A positive electrode active material $LiNi_{0.6}Co_{0.2}Mn_{0.2}O_2$ (NCM622), a conductive agent carbon black, a binder polyvinylidene fluoride (PVDF) were added into N-methyl pyrrolidone (NMP) and mixed to give a positive electrode slurry. The mass ratio of $LiNi_{0.6}Co_{0.2}Mn_{0.2}O_2$ (NCM622), conductive carbon black and PVDF in the positive electrode slurry is 97.5:2:0.5. The positive electrode slurry was coated on the current collector aluminum foil, oven dried at 85° C., then cold pressed to form a positive electrode film layer, a part of the positive electrode film layer was rolled to form a groove, then subjected to edge cutting, slicing, and striping, and then oven dried at 85° C. under vacuum for 4 h, to provide the positive electrode plate.

Example 8

A lithium-ion battery was prepared by a method similar to that of Example 1. The difference from Example 1 is that in Example 8, a groove (second recessed area) is provided on the surface of the negative electrode plate. The preparation method of the negative electrode plate is as follows:

A negative electrode active material artificial graphite, a conductive agent carbon black, a binder styrene butadiene rubber (SBR), and a thickener sodium hydroxymethylcellulose (CMC) in a weight ratio of 94.9:5.5:0.5:0.1 were dissolved in deionized water, and uniformly mixed to prepare a negative electrode slurry. The negative electrode slurry was coated on a current collector copper foil, oven dried at 85° C., then cold pressed to form a negative electrode film layer, a part of the negative electrode film layer was rolled to form a groove, then subjected to edge cutting, slicing, and striping, and then oven dried at 120° C. under vacuum for 12 h, to provide the negative electrode plate.

Comparative Example 1

A lithium-ion battery was prepared by a method similar to that of Example 1. The difference from Example 1 was that the material of the swellable polymer was replaced in Comparative Example 1. In Comparative Example 1, a 16 μm polyethylene film (PE) was used as the substrate film of the separator, and a coating was uniformly dotted on the surface of the substrate film. The coating includes polyvinylidene fluoride (VDF as a monomer).

TESTS

1. Battery Cell Capacity Retention Rate Test

Taking Example 1 as an example, the testing process of the battery capacity retention rate is as follows: at 45° C., the lithium-ion battery corresponding to Example 1 was charged to 4.25V at equivalent 1C, and then charged to a current of 0.05C at a constant voltage of 4.25V, laid aside for 5 min, and then discharged to 2.8V at 1C. The resulting capacity was recorded as an initial capacity C0. The above steps were repeated for the same battery above, and the discharge capacity Cn of the battery after the nth cycle was recorded at the same time, then the battery capacity retention rate after each cycle Pn=Cn/C0*100%; with the 1600 point values of P1, P2 . . . P1600 as the ordinates, and the corresponding cycle numbers as the abscissas, a graph of capacity retention rate vs cycle number of the battery corresponding to the polymer of Example 1.

During the test, the first cycle corresponded to n=1, the second cycle corresponded to n=2, . . . and the 1600th cycle corresponded to n=1600. The data of battery capacity retention rate corresponding to Example 1 in Table 1 is the data measured after 1600 cycles under the above test conditions, that is, the value of P1600.

The test procedures for Comparative Example 1 and other examples are the same as above.

2. Battery Cell DC Impedance Test

The lithium-ion battery (NCM622, design voltage 2.8-4.4V, use voltage 2.8-4.25V) prepared in the examples and comparative examples was charged at 45° C. at a constant current of 1C to 4.25V, and then charged at a constant voltage of 4.25V to a current of 0.05C. After standing for 5 min, the voltage V1 was recorded. Then, the battery was discharged at 1C for 30 s, the voltage V2 was recorded, and (V2−V1)/⅓ C, thus providing an internal resistance DCR1 of the battery after the first cycle. The above steps were repeated for the same battery as mentioned above, and the internal resistance DCRn (n=1, 2, 3, . . . , and 1600) of the battery after the nth cycle was denoted. A graph of the battery discharge DCIR and the number of cycles corresponding to the ester polymer of the examples and comparative examples was obtained with the 1600 point values of DCR 1, DCR2, DCR3, . . . , and DCR1600 as the ordinates, and with the corresponding number of cycles as the abscissas.

During the test, the first cycle corresponded to n=1, the second cycle corresponded to n=2, . . . , and the 1600th cycle corresponded to n=1600. For example, in Table 1, the internal resistance increase rate of the battery in Example 1=(DCRn-DCR1)/DCR1*100%, and the testing processes in Comparative Example 1 and other examples are the same as above.

The data in Table 3 is the data measured after 1600 cycles under the above test conditions.

Test Results

The test results are as shown in Table 1 to Table 3.

TABLE 1

| | Separator | | | | | | Electrode plate Liquid-retaining polymer | | | |
|---|---|---|---|---|---|---|---|---|---|---|
| | Swellable polymer | | | | | | | | | |
| No. | Main monomer | Swelling rate | Liquid absorption | Compression rate | Coating structure | Compression modulus | Monomer | Sedimentation value | Amount added in positive electrode | Amount added in negative electrode |
| Example 1 | Acrylate | 150.0% | 12% | 25% @ 1.25 MPa | Dotted | 45 MPa | None | None | 0.0% | 0.0% |
| Example 2 | Acrylate | 120.0% | 12% | 18% @ 1.25 MPa | Dotted | 45 MPa | 90% vinylidene fluoride + 10% hexafluoro-propylene | 2000% | 0.2% | 2.5% |
| Example 3 | Acrylate | 120.0% | 12% | 18% @ 1.25 MPa | Dotted | 45 MPa | None | None | 0.0% | 0.0% |
| Example 4 | Acrylate | 120.0% | 12% | 18% @ 1.25 MPa | Dotted | 45 MPa | Ethylene - vinyl acetate | 2000% | 0.0% | 2.5% |
| Example 5 | Acrylate | 120.0% | 12% | 18% @ 1.25 MPa | Strip structures at intervals | 45 MPa | None | None | 0.0% | 0.0% |
| Example 6 | 90% VDF-10% HFP | 220% | 220% | 18% @ 1.25 MPa | No coating | 52 MPa | None | None | 0.0% | 0.0% |
| Example 7 | Acrylate | 150.0% | 12% | 25% @ 1.25 MPa | Dotted | 45 MPa | None | None | 0.0% | 0.0% |
| Example 8 | Acrylate | 150.0% | 12% | 25% @ 1.25 MPa | Dotted | 45 MPa | None | None | 0.0% | 0.0% |
| Comparative Example 1 | VDF | 35.0% | 10% | 35% @ 1.25 MPa | Dotted | 40 MPa | None | None | 0.0% | 0.0% |

In Table 1, the compression rate 25% @ 1.25 MPa means that the compression rate of the separator is 25% at 1.25 MPa.

90% vinylidene fluoride+10% hexafluoropropylene in the monomers means that, based on the total mass of the monomers, the mass content of vinylidene fluoride is 90%, and the mass content of hexafluoropropylene is 10%.

The amount of the liquid-retaining polymer added in the positive electrode plate is 0.2%, which means that the mass content of the liquid-retaining polymer is 0.2% based on the total mass of the positive electrode film layer.

The amount of the liquid retaining polymer added in the positive electrode plate is 0.0%, indicating that no liquid retaining polymer is added in the positive electrode film 10 layer.

TABLE 2

| | Battery parameter | | | | | | |
|---|---|---|---|---|---|---|---|
| No. | M1 (mL) | M2 (mL) | y/Ah | y/$V_{total\ pore\ space}$ | Free electrolyte solution y(ml) | Capacity/Ah | Positive and negative electrode separator total pore space $V_{total\ pore\ space}$(ml) |
| Example 1 | 0.5 | 0.1 | 0.33% | 0.19% | 0.5 | 150 | 260 |
| Example 2 | 0 | 0 | 0.00% | 0.00% | 0 | 150 | 260 |
| Example 3 | 0 | 0.05 | 0.00% | 0.00% | 0 | 150 | 260 |
| Example 4 | 0 | 0.1 | 0.00% | 0.00% | 0 | 150 | 260 |
| Example 5 | 0.25 | 0.1 | 0.07% | 0.04% | 0.1 | 150 | 260 |
| Example 6 | 0.5 | 0.5 | 0.23% | 0.13% | 0.35 | 150 | 260 |
| Example 7 | 0.5 | 0.25 | 0.33% | 0.19% | 0.5 | 150 | 260 |
| Example 8 | 0.5 | 0.25 | 0.33% | 0.19% | 0.5 | 150 | 260 |
| Comparative Example 1 | 32 | 5 | 20.00% | 11.54% | 30 | 150 | 260 |

TABLE 2-continued

| No. | Battery parameter | | | | | |
|---|---|---|---|---|---|---|
| | Liquid electrolyte solution volume m/ρ(ml) | Positive electrode groove volume/ml | Negative electrode groove volume/ml | Positive electrode plate pore volume V1/mL | Negative electrode plate pore volume V2/mL | Separator compression volume/mL |
| Example 1 | 300 | 0 | 0 | 54 | 190 | 55 |
| Example 2 | 300 | 0 | 0 | 54 | 190 | 60 |
| Example 3 | 300 | 0 | 0 | 54 | 190 | 60 |
| Example 4 | 300 | 0 | 0 | 54 | 190 | 60 |
| Example 5 | 300 | 0 | 0 | 54 | 190 | 59 |
| Example 6 | 300 | 0 | 0 | 54 | 190 | 58 |
| Example 7 | 300 | 0 | 21 | 54 | 190 | 55 |
| Example 8 | 300 | 21 | 0 | 54 | 190 | 55 |
| Comparative Example 1 | 300 | 0 | 0 | 54 | 190 | 49 |

In Table 2, M1 is the amount of the electrolyte solution in the battery cell measured by the linear frequency sweep vibration test.

M2 is the amount of the electrolyte solution measured by first subjecting the battery cell to the linear frequency sweep vibration test and then to the extrusion test.

y represents the amount of free electrolyte solution measured in the battery cell without linear frequency sweep vibration test or extrusion test.

$V_{total\ pore\ space}$ is the pore volume of the electrode assembly, that is, the sum of the pore volume V1 of the positive electrode plate, the pore volume V2 of the negative electrode plate, and the pore volume of the separator.

The positive electrode groove volume refers to the total volume of the second recessed area provided in the positive electrode plate.

The negative electrode groove volume refers to the total volume of the second recessed area provided in the negative electrode plate.

The compression volume of the separator refers to the spatial volume generated by the compression of the separator when it is subjected to a pressure of 1.25 MPa.

TABLE 3

| No. | Lithium-ion battery performance | | |
|---|---|---|---|
| | Electrical performance parameters @ 1600 cls. | | |
| | Capacity retention rate | DCIR | 200 V external short circuit failure time |
| Example 1 | 82.00% | 80.00% | 20 min |
| Example 2 | 85.00% | 70.00% | 1.8 h |
| Example 3 | 83.00% | 78.00% | 2 h |
| Example 4 | 85.00% | 70.00% | 1.9 h |
| Example 5 | 83.00% | 79.00% | 1 h |
| Example 6 | 82.00% | 80.00% | 45 min |
| Example 7 | 82.00% | 75.00% | 22 min |
| Example 8 | 82.00% | 75.00% | 21 min |
| Comparative Example 1 | 75.00% | 120.00% | 2 s |

It can be seen from Table 3 that the separator of Comparative Example 1 does not incorporate a swellable polymer. During the cycle of the lithium-ion battery, due to the volume change of the lithium-ion battery, the electrolyte solution in the electrode assembly may be squeezed out, causing the problem of electrode solution shortage, thereby increasing the risk of lithium dendrites and worsening the operational reliability and cycling performance of the lithium-ion battery.

The embodiments of the present application incorporate a swellable polymer into the separator. The swellable polymer can lock the electrolyte solution and release the electrolyte solution during the charge and discharge process, which improves the electrolyte solution retention capacity of the electrode assembly and the wettability of the electrolyte solution to the electrode assembly, thereby improving the operational reliability and cycling performance of the lithium-ion battery.

Furthermore, adding a liquid-retaining polymer to at least one of the positive electrode plate and the negative electrode plate can further improve the operational reliability and cycling performance of the lithium-ion battery.

Although illustrative embodiments have been shown and described, those skilled in the art should understand that the above embodiments should not be construed as limitations on the present application, and that changes, replacements and modifications may be made to the embodiments without departing from the spirit, principles and scope of the present application.

What is claimed is:

1. A separator comprising two surfaces opposite to each other along its own thickness direction, wherein at least one surface of the two surfaces of the separator and/or an interior of the separator comprises a pore structure, the pore structure comprises a first recessed area, and the separator further comprises a swellable polymer capable of absorbing an electrolyte solution and locking the electrolyte solution into the separator, the swellable polymer comprises at least one of a first fluoropolymer, a first ester polymer, and a first ether polymer; and the separator satisfies: when a pressure of 1.25 MPa is applied along the thickness direction of the separator, a compression rate ΔV of the separator is ≤25%.

2. The separator according to claim 1, wherein the separator further satisfies:

a separator with an area of 5 cm×10 cm is taken and its mass ms1 is recorded in g;

the separator is immersed in excessive electrolyte solution at 25° C. for 7 days, then taken out and placed vertically until there is no droplet for 5 min, and its mass ms2 is recorded in g, then, ((ms2−ms1)/ms1)×100%≥10%.

3. The separator according to claim 1, wherein a swelling rate of the swellable polymer is ≥100%.

4. The separator according to claim 1, wherein a compression modulus of the separator is ≥45 MPa.

5. The separator according to claim 1, wherein the separator comprises a first porous substrate film containing the swellable polymer capable of absorbing the electrolyte solution and locking the electrolyte solution into the first porous substrate film.

6. The separator according to claim 1, wherein the separator comprises a second porous substrate film and a coating provided on at least one side of the second porous substrate film, and the coating comprises the swellable polymer capable of absorbing the electrolyte solution and locking the electrolyte solution into the coating, the surface of the coating facing away from the second porous substrate film comprises the first recessed area; or the first recessed area is enclosed between the coating and the second porous substrate film.

7. A battery cell comprising an electrode assembly and an electrolyte solution, wherein the electrode assembly comprises the separator according to claim 1.

8. The battery cell according to claim 7, further satisfying: $V_0/(m/\rho)\geq1$;

in a formula, $V_0$ represents a pore volume and interlayer gap volume in the electrode assembly in mL;

m represents a difference between a mass of the battery cell before oven drying and a mass after oven drying in g;

ρ represents a density of the electrolyte solution in g/mL.

9. The battery cell according to claim 7, wherein the electrode assembly comprises a first electrode plate and a second electrode plate, the first electrode plate and the second electrode plate are opposite in polarity, the separator is provided between the first electrode plate and the second electrode plate, and the surface of the first electrode plate facing toward the separator has at least one second recessed area.

10. The battery cell according to claim 9, wherein the first electrode plate comprise a current collector and a film layer provided on at least one surface of the current collector, the film layer comprises a liquid-retaining polymer and active material particles, the liquid-retaining polymer is distributed on a surface of the active material particles facing away from the current collector, the liquid-retaining polymer is capable of absorbing and locking an electrolyte solution to form an elastic porous sustained-release electrolyte adhered to the surface of the active material particles.

11. The battery cell according to claim 7, wherein the battery cell further comprises an electrolyte solution, and the electrolyte solution is located inside the electrode assembly.

12. The battery cell according to claim 7, wherein the battery cell satisfies:

$$(m/\rho)/V_{total\ pore\ space} \geq 80\%;$$

$V_{total\ pore\ space}$ represents a numerical value of pore volume of the electrode assembly in mL;

m represents a numerical value of difference between a mass of the battery cell before oven drying and a mass after oven drying in g;

ρ represents a numerical value of density of the electrolyte solution in g/mL.

13. The battery cell according to claim 7, wherein the battery cell satisfies:

$$0 \leq y/Ah \leq 15\%;$$

y represents a numerical value of volume of free electrolyte solution in the battery cell in mL;

Ah represents a numerical value of nominal capacity of the battery cell in Ah.

14. The battery cell according to claim 7, wherein the battery cell satisfies:

$$0 \leq y/V_{total\ pore\ space} \leq 15\%;$$

y represents a numerical value of volume of free electrolyte solution in the battery cell in mL;

$V_{total\ pore\ space}$ represents a numerical value of pore volume of the electrode assembly in mL.

15. The battery cell according to claim 7, wherein after a linear frequency sweep vibration test, the battery cell is charged to 100% state of charge (SOC), a hole is opened on the battery cell, the hole is provided at the lowest site in a vertical direction, and the volume of the electrolyte solution flowing out of the battery cell is recorded as M1, 0 mL≤M1≤0.5 mL;

wherein a vibration direction of a linear frequency sweep vibration test is: up-and-down single vibration;

a vibration frequency of a linear frequency sweep vibration test is: 10 Hz to 55 Hz;

the maximum acceleration of a linear frequency sweep vibration test is: 30 m/s$^2$;

a number of frequency sweep cycles of a linear frequency sweep vibration test is: 10 times; and a vibration time of a linear frequency sweep vibration test is: 3 h.

16. The battery cell according to claim 7, wherein after a linear frequency sweep vibration test, the battery cell is charged to 100% state of charge (SOC), a hole is opened on the battery cell, the hole is provided at the lowest site in a vertical direction, and the volume of the electrolyte solution flowing out of the battery cell is recorded as M1, and M1 is 0 mL, wherein after the battery cell is subjected to a linear frequency sweep vibration test, the electrode assembly is taken out, and after the electrode assembly is subjected to an extrusion test, the volume of the electrolyte solution flowing out of the electrode assembly is recorded as M2, 0 mL≤M2≤0.5 mL; and, wherein an extrusion direction of the extrusion test is: perpendicular to the thickness direction of the electrode assembly;

an extrusion degree of the extrusion test is: an extrusion pressure is 0.35 MPa, wherein after the battery cell is subjected to the linear frequency sweep vibration test, the electrode assembly is taken out, and after the electrode assembly is subjected to the extrusion test, the volume of the electrolyte solution flowing out of the electrode assembly is recorded as M2, and M2 is 0 mL.

17. The battery cell according to claim 7, wherein the first fluoropolymer comprises at least one of the structural units represented by formula (AI), formular (AII), or formula (AIII), Formula (AI)

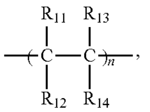

Formula (AII)

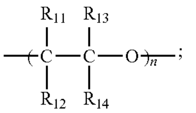

Formula (AIII)

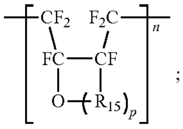

in formula (AI) and formula (AII), $R_{11}$, $R_{12}$, $R_{13}$ and $R_{14}$ each independently comprise a hydrogen atom, a fluorine atom, a chlorine atom, substituted or unsubstituted alkyl or substituted or unsubstituted alkoxy, and at least one of $R_{11}$, $R_{12}$, $R_{13}$ and $R_{14}$ comprises a fluorine atom, in formula (AIII), $R_{15}$ includes a single bond, substituted or unsubstituted alkyl; when substituted, the substituent includes a fluorine atom, p is a positive integer selected from 1 to 3, $R_{11}$, $R_{12}$, $R_{13}$ and $R_{14}$ each independently comprise a hydrogen atom, a fluorine atom, a chlorine atom, substituted or unsubstituted alkyl or substituted or unsubstituted alkoxy, the first ether polymer comprises a structural unit represented by formula (BI), Formula (BI)

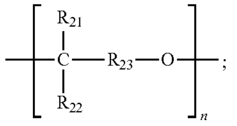

Formula (BII)

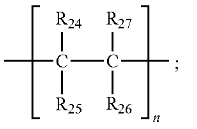

in formula (BI), $R_{21}$ and $R_{22}$ each independently comprise a hydrogen atom, substituted or unsubstituted alkyl, or substituted or unsubstituted alkoxy; and $R_{23}$ comprises a single bond or substituted or unsubstituted methylene, in formula (BII), $R_{24}$ to $R_{27}$ each independently comprise a hydrogen atom, substituted or unsubstituted alkyl, substituted or unsubstituted alkoxy, or an ether group, and at least one of $R_{24}$ to $R_{27}$ comprises substituted or unsubstituted alkoxy or an ether group, the first ester polymer comprises a structural unit represented by formula (CI), formula (CII), or formula (CIII), Formula (CI)

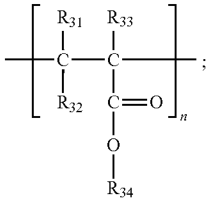

Formula (CII)

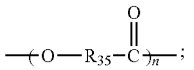

Formula (CIII)

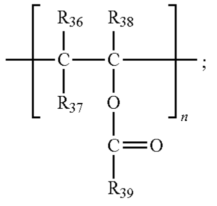

in formula (CI), $R_{31}$, $R_{32}$ and $R_{33}$ each independently comprise a hydrogen atom or substituted or unsubstituted alkyl; $R_{34}$ comprises substituted or unsubstituted alkyl or substituted or unsubstituted hydroxyalkyl, in the formula (CII), $R_{35}$ comprises substituted or unsubstituted methylene, in formula (CIII), $R_{36}$, $R_{37}$ and $R_{38}$ each independently comprise a hydrogen atom, or substituted or unsubstituted C1-C8 alkyl; $R_{39}$ comprises substituted or unsubstituted C1-C8 alkyl.

18. The battery cell according to claim 7, wherein the swellable polymer comprises the first fluoropolymer, the first fluoropolymer is at least one selected from polyperfluoroethylene PTFE, polyvinylidene fluoride PVDF, perfluoroethylene propylene copolymer FEP, perfluoroalkoxy polymer PFA, perfluoropolyether PFPE, polyvinylidene fluoride-hexafluoropropylene copolymer PVDF-HFP, polyvinylidene fluoride-trifluoroethylene copolymer PVDF-TrFE, and perfluoro (1-butenyl vinylether) polymer.

19. A battery, comprising a battery cell, the battery cell comprising the separator according to claim 1.

20. An electrical apparatus, comprising the battery according to claim 19.

* * * * *